(12) United States Patent
Medlin

(10) Patent No.: US 6,327,954 B1
(45) Date of Patent: *Dec. 11, 2001

(54) LIGHTWEIGHT ARMORED VEHICLE AND METHOD OF MAKING SAME

(76) Inventor: Richard C. Medlin, P.O. Box 2340, San Angelo, TX (US) 76902

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/557,054
(22) PCT Filed: Jun. 2, 1994
(86) PCT No.: PCT/US94/06172
§ 371 Date: Apr. 3, 1997
§ 102(e) Date: Apr. 3, 1997
(87) PCT Pub. No.: WO94/29665
PCT Pub. Date: Dec. 22, 1994

Related U.S. Application Data

(63) Continuation-in-part of application No. 08/073,186, filed on Jun. 3, 1993, now abandoned.

(51) Int. Cl.$^7$ .................................................. F41H 5/14
(52) U.S. Cl. .................. 89/36.08; 89/36.02; 296/96.21
(58) Field of Search ........................... 89/36.07, 36.08, 89/36.09, 36.02, 36.14; 296/96.21

(56) References Cited

U.S. PATENT DOCUMENTS

| | | |
|---|---|---|
| 678,064 | 7/1901 | Theis . |
| 1,758,296 | 5/1930 | Schaumann . |
| 2,024,773 | 12/1935 | Lohrman ............................ 296/48 |
| 2,226,833 | 12/1940 | Rider ................................. 296/84 |
| 2,399,184 | 4/1946 | Heckert ............................ 154/52.5 |
| 2,562,951 | 8/1951 | Rose et al. ...................... 154/52.5 |
| 2,697,054 | 12/1954 | Dietz et al. ..................... 154/52.5 |
| 2,743,035 | 4/1956 | Fogarty ............................ 220/88 |
| 3,000,772 | 9/1961 | Lunn ................................ 154/52.5 |
| 3,009,845 | 11/1961 | Wiser ............................... 154/2.7 |
| 3,045,293 | 7/1962 | Potchen .............................. 20/4 |
| 3,414,445 | 12/1968 | Orcutt ............................... 156/106 |
| 3,424,642 | 1/1969 | Orcutt ............................... 161/45 |
| 3,444,033 | 5/1969 | King ................................. 161/38 |

(List continued on next page.)

FOREIGN PATENT DOCUMENTS

| | | |
|---|---|---|
| 4006-710 | 6/1991 | (DE) . |
| 4006-709 | 9/1991 | (DE) . |
| 4006-711 | 9/1991 | (DE) . |
| 42 36 234 A1 | 4/1994 | (DE) . |
| 1432466 | 2/1966 | (FR) . |

OTHER PUBLICATIONS

Kevlar, Aramid, Lightweight protective armor of Kevlar® aramid, Du Pont (Brochure, pp. 1–8).

*Primary Examiner*—Stephen M. Johnson
(74) *Attorney, Agent, or Firm*—Jackson Walker L.L.P.

(57) ABSTRACT

An improved lightweight armored vehicle and a cost effective method of retrofitting standard automobiles to make them lightweight armored vehicles. Metal edge channels and edge caps fit about laminated windows to protect the laminated edges for stress, moisture and atmosphere and fit within the standard automobile original window frames. Prefabricated formed lightweight composite armor is molded to closely fit within the standard automobile. Ballistic steel opaque armored elements are cut and sized to fit within the standard automobile. Both transparent and opaque armored elements are designed for cost effective, onsite manufacture of components to cost effective installation procedures to put in affordable lightweight armored vehicle.

18 Claims, 14 Drawing Sheets

U.S. PATENT DOCUMENTS

| | | | |
|---|---|---|---|
| 3,453,161 | 7/1969 | Golightly | 156/102 |
| 3,455,409 | 7/1969 | Clark | 180/82 |
| 3,504,644 | 4/1970 | Schibisch | 109/49.5 |
| 3,509,833 | 5/1970 | Cook | 109/82 |
| 3,522,142 | 7/1970 | Wismer et al. | 161/190 |
| 3,581,621 | 6/1971 | Bauer et al. | 89/36 |
| 3,671,370 * | 6/1972 | Littell, Jr. | 89/36.14 |
| 3,791,914 | 2/1974 | Ammons et al. | 161/190 |
| 3,832,266 | 8/1974 | Archibald | 161/93 |
| 3,855,898 | 12/1974 | McDonald | 89/36 H |
| 3,889,434 | 6/1975 | Shelver | 52/172 |
| 3,924,038 | 12/1975 | McArdle et al. | 428/49 |
| 3,930,452 | 1/1976 | Van Laethem et al. | 109/80 |
| 3,958,276 | 5/1976 | Clausen | 2/2.5 |
| 4,027,443 | 6/1977 | Briggs | 52/202 |
| 4,029,838 | 6/1977 | Chamis et al. | 428/301 |
| 4,057,359 | 11/1977 | Grooman | 415/9 |
| 4,061,815 | 12/1977 | Poole, Jr. | 428/215 |
| 4,075,386 | 2/1978 | Willdorf | 428/216 |
| 4,079,464 | 3/1978 | Roggin | 2/2.5 |
| 4,081,581 | 3/1978 | Littell, Jr. | 428/138 |
| 4,090,005 | 5/1978 | Morgan | 428/76 |
| 4,115,616 | 9/1978 | Heitz et al. | 428/310 |
| 4,130,684 | 12/1978 | Littell, Jr. et al. | 428/212 |
| 4,132,446 * | 1/1979 | Bauer | 296/155 |
| 4,179,979 | 12/1979 | Cook et al. | 89/36 |
| 4,198,468 | 4/1980 | Molari | 428/412 |
| 4,198,707 | 4/1980 | Haupt et al. | 2/2.5 |
| 4,204,026 | 5/1980 | Le Grand et al. | 428/409 |
| 4,232,069 | 11/1980 | Windecker | 428/47 |
| 4,241,457 | 12/1980 | Klein et al. | 2/2.5 |
| 4,243,719 | 1/1981 | Holmes | 428/411 |
| 4,312,903 | 1/1982 | Molari, Jr. | 428/34 |
| 4,316,404 | 2/1982 | Medlin | 89/36 H |
| 4,328,277 | 5/1982 | Molari, Jr. | 428/215 |
| 4,352,316 | 10/1982 | Medlin | 89/36 A |
| 4,595,624 | 6/1986 | Greathead | 428/213 |
| 4,648,136 | 3/1987 | Higuchi | 2/2.5 |
| 4,738,893 | 4/1988 | Grillo | 428/252 |
| 4,739,690 | 4/1988 | Moskowitz | 89/36.02 |
| 4,774,143 | 9/1988 | Gondela et al. | 428/442 |
| 4,861,666 | 8/1989 | LeGrand et al. | 428/412 |
| 4,911,061 | 3/1990 | Pivitt et al. | 89/36.02 |
| 5,271,311 * | 12/1993 | Madden, Jr. | 89/36.08 |
| 5,340,189 * | 8/1994 | Goodman | 89/36.01 |

* cited by examiner

LIGHTWEIGHT ARMORED VEHICLE AND METHOD OF MAKING SAME

This application is a continuation-in-part of U.S. patent application Ser. No. 08/073,186, filed on Jun. 3, 1993, and now abandoned.

BACKGROUND OF THE INVENTION

An improved lightweight armored vehicle and cost effective method of retrofitting standard automobiles to make them lightweight armored vehicles is disclosed. Metal caps fit about laminated windows to protect the laminated edges from stress, moisture and atmosphere and fit within the standard automobile's original window frame. Alternative laminated break-in resistant windows fit within a standard automobile's original window frames. Prefabricated rigidly formed lightweight opaque armor is molded to closely fit within the standard automobile. The armor is designed for cost effective on-site manufacture of components and cost effective installation procedures to produce an affordable lightweight armored vehicle.

BRIEF DESCRIPTION OF THE PRIOR ART

The most prevalent method of armoring a standard automobile is by adding steel plate where opaque armor is appropriate, replacing standard window frames with larger window frames and adding laminated transparent armor within the new larger window frames. Such retrofitted armored vehicles are heavy, expensive to manufacture and maintain, have limited maneuverability, and have other deficiencies.

Prior to the present invention, modifying a standard automobile to give it lightweight armored protection generally involved retrofitting the vehicle by stripping its inner furnishings, then measuring the vehicle as needed to determine the needed armor, then preparing, sizing and shaping armor and mountings and modifying the vehicle to accept the armor and mountings, then installing the armor and mountings, trimming the same for final fit during installation, then doing body work as needed to hide the armor and reassembling the interior furnishings of the vehicle. This process was best described in U.S. Pat. Nos. 4,352,316; 4,316,404; 4,336,644; and 4,333,282 the disclosures of which are fully incorporated herein by reference. As discussed there in more detail, the window mechanisms are removed, and a support system installed in each door for supporting a composite lexguard and laminate safety plate glass window in a permanently closed position. Frames are rebuilt to receive and permanently seal with the new sidelights. The automobile's frame is stuffed with flexible bullet resistant material such as woven ballistic cloth which is cut on the spot to fit and glued within the frame. Flat opaque portions of the automobile, including the doors, sidewalls, fire wall and rear seat area are measured and retrofitted with a flat rigidly woven polyester-glass protective layer cut as needed to fit the vehicle together with overlapping flexible layers of woven ballistic polyester glass fibers. The vehicle's top and bottom were equipped with multiple layers of flexible ballistic nylon secured by silicone. The fuel tank was wrapped in flexible ballistic nylon attached with glue to make it become rigid.

The prior method of producing lightweight armored vehicles was time consuming, expensive, and required extensive modification of the vehicle, particularly to accept armored windows. The permanent window mountings made it difficult to replace damaged windows. Body work was required to hide the substantial modification of the vehicle's window frames to accept the thick outer edges of laminated armored windows. The edges of the laminated windows were not adequately sealed from atmosphere and moisture, thus permitting some of the laminated armored windows to delaminate or discolor over time. The ad hoc reframing subjected the edges of the armored windows to stress during manufacture and use. This caused some of the unreinforced armored window edges to crack, particularly in the event of temperature changes. Substantial deconstruction and reconstruction was required to replace delaminated, yellowed or cracked windows because the armored window was permanently installed. The opaque armor, flexible woven ballistic cloth linings, flat rigidly formed plate, etc. was chosen for ease of manufacture and ease of ad hoc adaption of individual armor components to varied vehicles rather than ballistic qualities.

SUMMARY OF THE INVENTION

It is an object of the present invention to provide an improved lightweight armored vehicle, improved components for lightweight armored vehicles and other armored structures and improved methods of manufacturing lightweight armored vehicles and such components.

DESCRIPTION OF THE PREFERRED EMBODIMENT

The improvements described herein produce an improved lightweight armored vehicle by improved methods. These improvements include, without limitation, improved methods of designing and manufacturing armored windows and preparing them for installation, improved methods of designing and manufacturing opaque armor, improved break-in resistant windows, the collection of the several inventions into an efficient manufacturing process for lightweight armored vehicles and the other inventions described herein.

Figure 1:
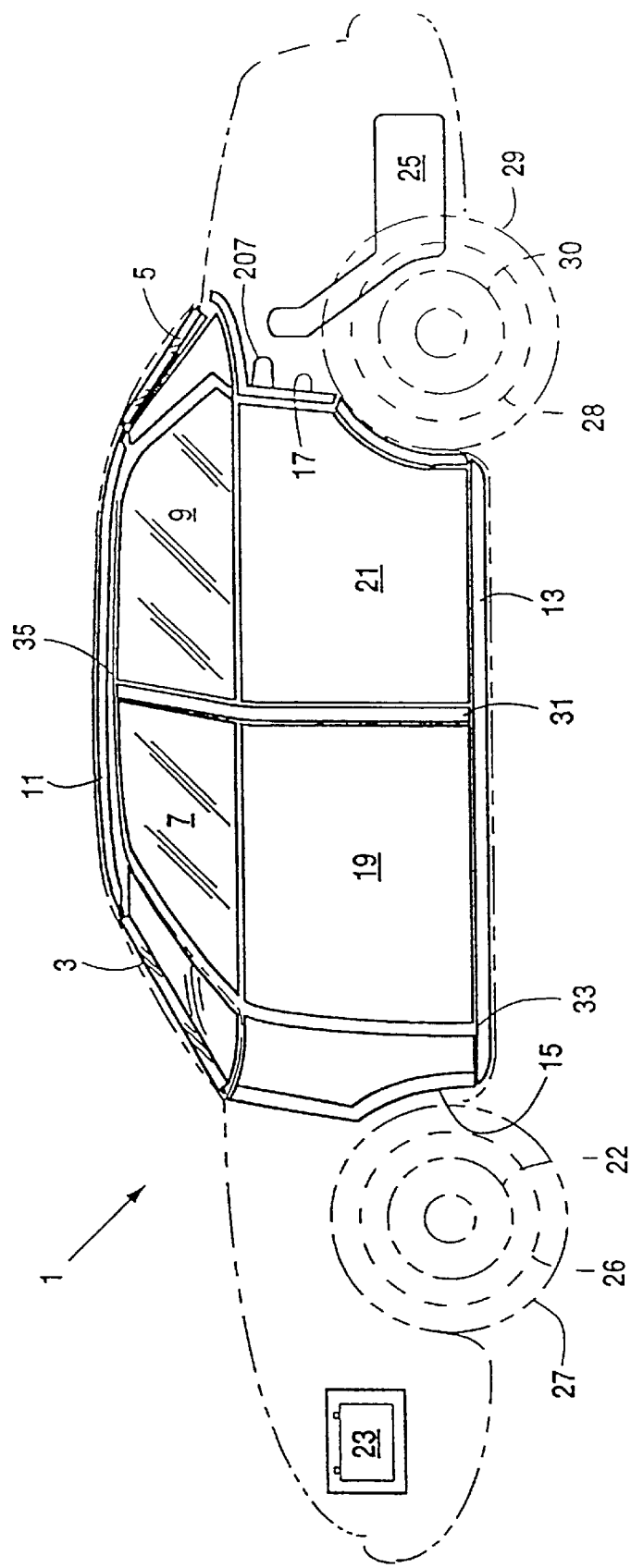
FIG. 1 is a perspective view of a standard automobile retrofitted with lightweight armor and also, as explained below, a perspective view of plugs molded against inner surfaces of the vehicle for use in making molds for making the opaque armor.

FIG. 1 shows a perspective view of a standard automobile retrofitted with lightweight armor. The armored vehicle 1 has armored windshield 3, rear armored backlight 5, right front armored sidelight 7, right rear armored sidelight 9, roof armor 11, floor armor 13, front armor 15, rear armor 17, right front side armor 19, right rear side armor 21, battery armor 23, fuel tank armor 25, right front safety tire 27, right rear safety tire 29, right door frame armor 31, and right front door frame armor 33.

The left side of the vehicle has armor which corresponds to that shown in FIG. 1. The described armor, in conjunction with the vehicle's frame, combines to encompass the passenger compartment of the vehicle 1 within a protective ballistic layer and to improve the likelihood that vehicle occupants will survive an attack on the vehicle and to improve the vehicle's ability to maneuver after being hit with projectiles.

Safety tires 27 and 29 have metal or plastic injection molded safety inserts 26 and 28 tightly secured to the wheel rims 22 and 30. safety inserts 26 and 28 have a radius less than the inner radius of safety tires 27 and 29. Safety Roller brand safety inserts manufactured by Hutchinson of Trenton New Jersey are acceptable safety inserts.

Window Manufacture

The first step in manufacturing transparent laminated armor is to select the components needed to provide the desired level of ballistic resistance and trim them to size. Transparent armor is typically identified by its United Laboratories (UL) bullet resistance ability. UL II armor is preferably comprised of an outer layer of 0.25 inch float glass, a first interlayer of 0.050 inch urethane and a second layer of 0.5 inch polycarbonate with a hard surface coating. UL III armor is preferably comprised of an outer layer of 0.5 inch glass, a 0.050 inch urethane interlayer and a 0.25 inch polycarbonate layer with a hard surface inner coating. UL IV transparent armor is preferably comprised of a 0.5 inch float glass layer, a 0.060 inch first interlayer of polybutal vinyl, a second layer of 0.5 inch glass, a third inner layer of 0.050 inch polyurethane and a 0.25 inch polycarbonate layer having a hard surface coating. UL IV AP armor plate is preferably comprised of an outer layer of 0.675 inch glass, an interlayer of 0.060 inch interlayer polybutal vinyl, a 0.675 inch glass layer, a 0.050 inch polyurethane interlayer, and a 0.25 inch polycarbonate layer. Nato level III window armor may be one-half-inch glass, three-eighths-inch glass, and three-sixteenths polycarbonate with appropriate interlayers. The above descriptions show that other variations of layers and thickness may be usefully employed.

It is common in the prior art to size bullet resistant glass with a diamond saw, laminate the layers and then trim the resultant laminated transparent armor with a diamond saw. Cutting and trimming with a diamond saw produces sharp edges. Sharp edges are unsafe and may cause an uneven distribution of forces on the edge of the glass during manufacture, mounting, and use; this may cause the glass to crack. Current laminated windows installed in automobiles sometimes crack on hot days with cold rainstorms due to uneven edge stress.

Figure 2A:
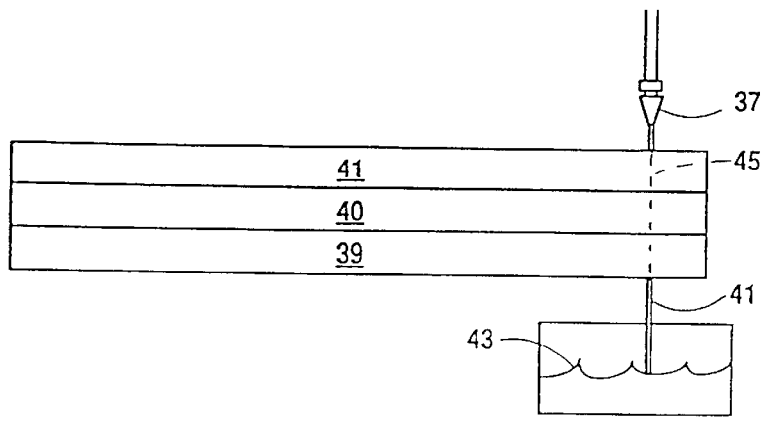
FIG. 2A shows a water jet cutting a laminated armored window.

FIG. 2A shows a preferable method of cutting laminated transparent armor. As water jet cutter 37 cuts laminated armored window 42 comprised of first glass layer 39, second glass layer 40, and polycarbonate layer 41 it both deburrs laminated armored window 42 and removes its sharp edges. Water stream 41 is preferably comprised of a water/hard particle admixture to speed cutting ballistic glass. The hard particles are preferably comprised of 80 to 200 grit granite aggregate. Water stream 41 carries the removed glass particles into the receiving pool 43 thus decreasing gritty airborne dust produced by diamond wheels that can harm the optical quality of bullet resistant glass 39. Water jet cutter 37 is preferably computerized to permit standardization and quality control for mass production. Water jet cutter 37 is used both to size individual sheets of bullet resistant glass 39 and 40 and polycarbonate 41 and to trim resultant laminated glass/polycarbonate armored windows 42. The smooth edges 45 produced by water cutter 37 minimize edge stress during manufacture, mounting and use. After trimming layers 39, 40 and 41 to size they are washed, cleaned, vacuumed and used as transparent armor components.

If laminated armored window 42 is to be a curved window it is cut and its edges trimmed before it is bent to minimize edge stress during bending. Further smoothing and rounding of outer edges of the glass with a wet belt sander before manufacturing processes such as bending and final installation additionally minimizes edge stress and possible cracking.

Figure 2B:
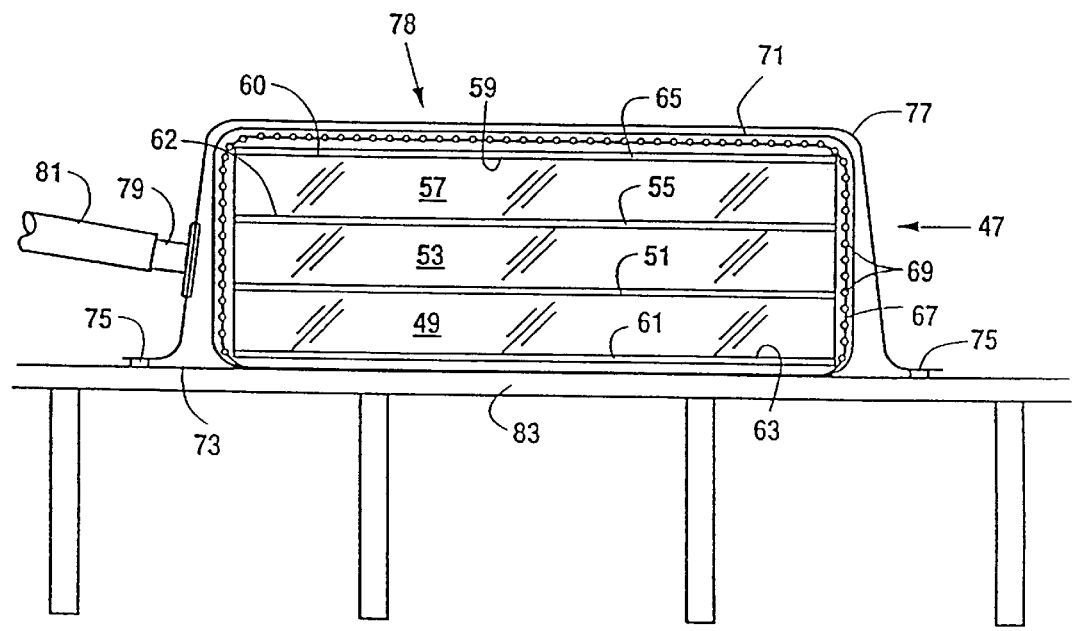
FIG. 2B shows the components of a flat laminated window disposed for lamination.

FIG. 2B shows a UL IV transparent armor glass polycarbonate stack 47 comprised of 0.5 inch float glass layer 49, a 0.060 first interlayer of polybutal vinyl 51, a second layer of 0.5 inch glass 53, a second interlayer of 0.050 polyurethane 55, a 0.25 inch polycarbonate layer 57 and a hard surface coating 59. A 1/16 inch throw away polycarbonate or glass sheet 61 protects the optical quality of the outer surface 63 of glass layer 49. A 1/16 inch press glass or polycarbonate sheet 65 is placed on top of polycarbonate layer 57 to protect hard surface coating 59.

The glass layers used in the invented method may be comprised of OEM safety glass, OEM tempered glass, float glass, or any other suitable type of glass.

The glass to polycarbonate interlayer 55 may usefully vary from 0.025 inches to 0.10 inches. For vehicles destined to be used in hot climates it is preferable to use a thicker glass to polycarbonate interlayer 55 to accommodate the different thermal expansion properties of glass and polycarbonate. Interlayer 55 which is approximately 0.075 inches thick is preferable in hot climates. Polyurethane is preferably used as interlayer 55 between glass to polycarbonate surfaces. Polyurethane layers melt or have a viscosity flow temperature in the range of approximately 220°–270° Fahrenheit.

Prior art methods typically use a polybutal vinyl film as the interlayer between glass to glass surfaces. Prior art polybutal vinyl interlayers typically have a viscosity flow temperature of approximately 280° Fahrenheit and must be heated for approximately thirty minutes at that heat to fully laminate layers.

It is useful for the innermost surface of armored window 42 to be coated with a hard surface coating 59. Because typical hard surface coatings have a melting point of approximately 277° Fahrenheit it is difficult to heat the armored window's precursor layers and interlayers, including the polybutal vinyl layer, sufficiently to laminate them together without harming the hard surface coating.

Some prior art methods use uncoated polycarbonate layers during lamination and bending of the laminated armored window because the prior art methods would otherwise mar or melt the hard surface coating. Other prior art methods use a polycarbonate layer having a hard surface coating on both sides as the polycarbonate layer work piece. However, a hard surface coating on the outboard face of the polycarbonate layer attached to second interlayer 55 sometimes causes bubbling and imperfect adhesion due to incompatibility of the outboard hard surface coating and interlayer 55.

A preferable method is to use a polycarbonate layer 57 with a hard surface coating 59 on the inboard face 60 and not on outboard face 62 and a one-sixteenth inch polycarbonate press sheet 65 with a melting point lower than that of the hard surface coating 59 as a press sheet on top of the hard surface coating 59. Press sheet 65 protects hard surface coating 59 and the acceptable optical quality of the outer layer of press sheet 65 is transferred to hard surface coating 59. This permits elimination of the prior art method of adding the hard surface coating 59 in a later additional step, protects hard surface coating 59 and permits better lamination.

Using a throw-away glass layer with a silicon coating as a press sheet against the inner polycarbonate layer surface rather than a throw-away polycarbonate layer gives the inner polycarbonate surface better optical qualities.

An additional or alternative preferable method is to use a glass to glass interlayer 51 with a lower softening temperature than hard surface casting 59. A flexible plastic film Saflex TG plastic inner layer, chemical name plasticized polyvinyl butyryl manufactured by Monsanto Company has a viscosity flow temperature of approximately 280° Fahrenheit. Use of plasticized polyvinyl butyryl as the glass to glass interlayer makes it possible to heat the glass polycarbonate stack 47 sufficiently to laminate glass layers 49 and 53 together without raising the temperature high enough to create hairline fractures in hard surface coating 59.

An additional or alternative preferable method is to first laminate glass layers 49 and 53 together using whatever interlayer 51 and heat is desirable, including a high heat if desired, and second laminate polycarbonate layer 57 to glass layer 53 via polyurethane interlayer 55 at a temperature substantially less than needed to melt interlayer 51 or which would mar hard surface coating 59.

An additional or alternative method is to use an extruded sheet of urethane having a viscosity flow temperature of less than 220° Fahrenheit as interlayer 51. Preferable such urethane sheets are sold and designated as urethane product M.P.2275 by J.P.S. Elastomerics Corp. or urethane product 275 by Deerfield, Inc. These products require heating for approximately thirty minutes to usefully laminate layers.

An additional or alternative method is to use urethane products as interlayers which have a useful viscosity flow temperature as low as 190° Fahrenheit for laminating layers if heated for at least approximately one hour. This permits omission of press sheet 65.

These methods permit the use of a polycarbonate layer 57 with its inbound surface 60 but not its outbound surface 62 prepared with hard surface coating 59 as the inner polycarbonate layer 57 throughout the manufacturing process of making a flat or curved laminated window. A preferable polycarbonate layer 57 with a hard surface coating 59 on only one side is Cyrolon ARI polycarbonate sheet manufactured by Cyro Industries of Mt. Arlington, N.J.

Polycarbonate layers are often delivered with a 3-ml. protective film which creates static electricity when pealed off. The static electricity attracts hair and dust to the polycarbonate layers marring the resultant armored window's optical clearness. After the protective film is removed from the polycarbonate layers it is preferable to clean them with a brush designed to remove the static electricity such as a Seal E-Z straight brush seal type 6.0 nylon manufactured by Sealeze Corporation of Richmond, Va.

The layers and interlayers 49, 51, 53, 55, 57 are placed upon each other as shown in FIG. 2B and wrapped in a breathable teflon film 67 with holes 69. A breathable soft high temperature blanket 71 is wrapped about teflon film and contents. Teflon film 67 prevents the glass/polycarbonate layers 49, 53 and 57 from sticking to high temperature blanket 71.

The high temperature blanket 71 and contents are placed on first sheet of high temperature film 73. Sealant tape 75 is placed about the edges of first sheet of high temperature film 73. Second sheet of high temperature film 77 is affixed by sealant tape 75 to first sheet of high temperature film 73, making an airtight high temperature vacuum bag 78, enclosing the stack of layers 47. Second sheet of high temperature film 77 has a one-way outlet 79 for evacuating the space within high temperature vacuum bag 78. Vacuum line 81 is connected to one way outlet 79. Alternatively, a reusable clam shell vacuum bag may be used instead of the described high temperature vacuum bag 78. The clamshell bag has rigid metal sides, a flexible rubber top and bottom, and an outlet.

The degassed high temperature bag 78 and contents are placed in a tack oven. The tack oven's temperature is gradually raised to a range of 130°–160° Fahrenheit, preferably approximately 140° Fahrenheit. This causes interlayers 51 and 55 to become tacky and adhere to layers 49, 53 and 57. A negative pressure in the range of 17 Hg–30 Hg, preferably approximately 29 Hg is pulled on high temperature vacuum bag 78 and contents through outlet 79 while it is being heated in the tacking oven. This removes additional residual air and moisture from between layers 49, 53 and 57 and compresses them together.

After removal from the tack oven high temperature vacuum bag 78 and contents are stood on an end on a cart or placed on autoclave table with a flat segmented surface and moved thereon into a high pressure vessel autoclave. Negative pressure is continued to be pulled on high temperature vacuum bag 78. The pressure and temperature inside the autoclave is gradually increased to a range of 160 lbs.–210 lbs. per square inch, preferably approximately 290°

Fahrenheit and approximately 180 lbs. per square inch and then gradually decreased to room temperature and atmospheric pressure during a range of 2–4 hours, preferably approximately 2.5 hours. Maintaining pressure, heat and vacuum for a longer period of time than is typical in the prior art lessens the presence of air bubbles and residual moisture between layers 49, 53, 57. This produces a laminated glass composite window.

The laminated window is allowed to cool slowly on the autoclave table's flat segmented surface to minimize the thermal shock of rapid or uneven cooling which would harm the laminated window. After the laminated window has cooled to room temperature throw-away layer 61 and press layer 65 are removed.

The edges are trimmed to size and cleaned. The laminated window is inspected with back lighting for optical quality. A label with a pre-printed identification code is sandwiched between layers 59, 53, 57 prior to lamination. When the vehicle in which the laminated window will be installed becomes known the vehicle's VIN number is etched into the armored window. Sheets of plastic are put on the front and back of the window to keep it from getting scratched.

The armored window's outer edges are coated with urethane and a metal edge cap sealed about the window's edges with urethane. Coating the edges of the laminated layers with a urethane sealant and an encapsulating metal edge cap protects the armored window from air and moisture getting between the layers and protects the armored window's edges from mechanical stress.

Curved Window Manufacture

Prior art armors typically use curved armored windows delivered from major glass manufacturers. The invented method permits efficient on-site manufacture of curved armored windows specifically sized and shaped to fit in desired armored vehicles.

Figure 3:
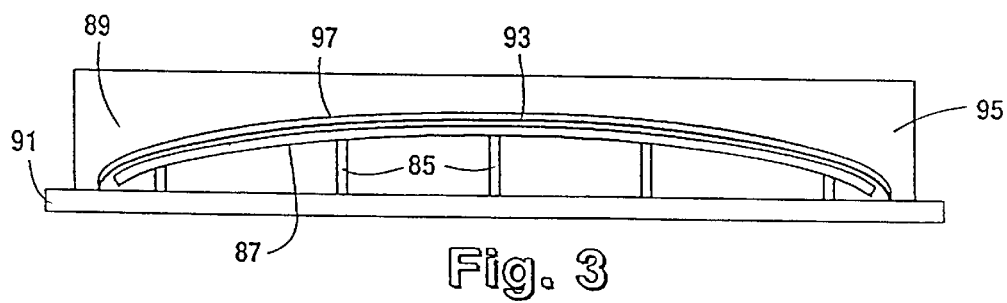
FIG. 3 shows a cut-away view of a mold for a ballistic window.

Curved transparent laminated armor adapted for use in a standard vehicle can be made by making a mold using an original equipment manufacture (OEM) windshield or OEM side light as a plug. FIG. 3 shows a cut-away view of the process of making a mold for such a ballistic window. Wooden supports 85 are shaped to support interior side of a curved OEM window 87. Curved OEM window 87, supported by wood supports 85, is placed in mold container 89 situated on shaker table 91. An appropriate throw-away layer 93 may be placed on the outer surface of curved OEM window 89 to protect it from being marred.

A ceramic molding material is mixed in a motor mixer to make it castable. A sufficient amount of prepared molding material 95 is added to mold container 89 to completely cover curved OEM window 87 in a sufficient depth to prepare a useful mold. Prior art methods typically use time and dehydration setting molding materials. It is preferable to use a thermo setting molding material. A preferable thermally set ceramic molding material is thermo-sil castable 220 made by Ceradyne Thermo Materials of Atlanta, Ga. Use of a thermal set molding material permits greater control and a more efficient manufacturing process.

After molding material 95 is added to mold container 89 and before molding material 95 sets, shaker table 91 shakes mold container 89, curved OEM window 87 and molding material 95 to shake out air bubbles and moisture and help produce a smooth resultant mold inner surface 97. Thereafter, mold container 89 is placed in an oven and heated at a temperature high enough to set thermosetting molding material 95.

An alternative mold making process is to spray curved OEM window 87 or other substrate object with a material, such as fiberglass, having a lower melting point than curved OEM glass 87 and molding material 95. A fluid fiberglass mixture is placed against the inner surface of the curved OEM glass and cured to make a hard fiberglass plug. The resultant hard fiberglass plug is removed from the OEM window, and placed into and supported in mold container 89. Molding material 95 is placed on the fiberglass plug and the collection shaken to remove air bubbles and help produce a smooth resultant mold surface. Mold container 89 and contents are inverted and placed in an oven and heated to set molding material 95. This produces a mold for curved glass which duplicates curved OEM window 87. The fiberglass plug's lower melting point makes it less likely that the surface of mold 97 or curved OEM window 87 will be harmfully etched than if curved OEM glass plug 87 is used as the plug.

Figure 4A:
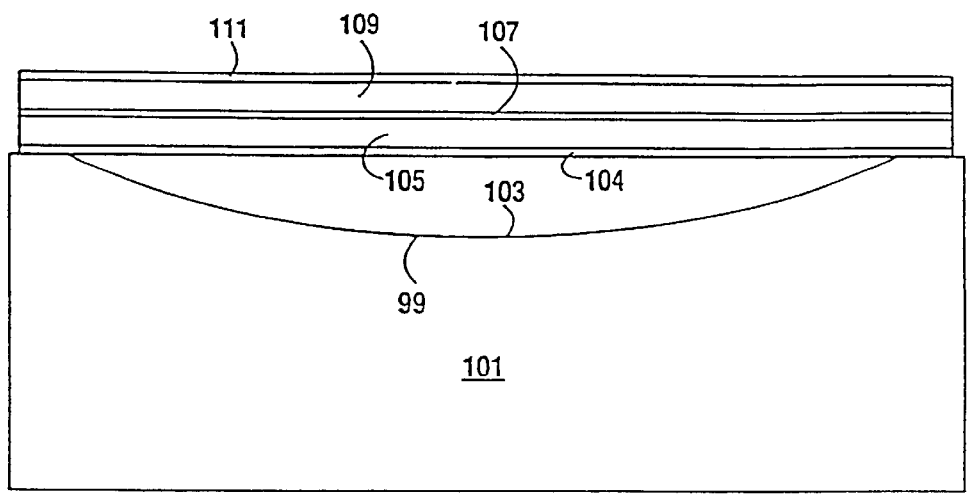
FIGS. 4A and 4B show a method of bending layers for a curved laminated ballistic resistant window.
Figure 4B:
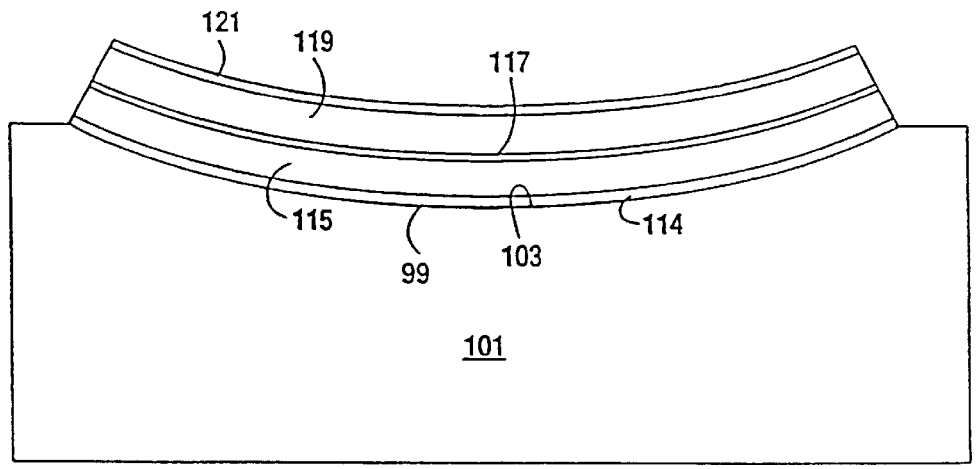

FIG. 4A shows a method of curving layers of glass and polycarbonate on mold 101. Throw-away thin glass or polycarbonate sheet 104 (typically $\frac{1}{8}$ an inch thick), glass layer 105, interlayer 107, polycarbonate layer 109 and press layer of glass or polycarbonate 111, are sized to produce the desired thickness and size laminated window, and placed on mold 101 as shown. This collection is heated in an oven at a temperature and for a time period sufficient to bend layers, 103, 105, 107, 109 and 111 to conform them to mold surface 99 as shown in FIG. 4B.

After removal of throw-away sheets 104 and 111, the bent layers 115 and 119 are stacked in the desired order with interlayers, placed in a breathable teflon film 67, high temperature blanket 71 and high temperature vacuum bag 78 as described above, the air evacuated from high temperature vacuum bag 78 and heat, vacuum, and pressure applied in an autoclave to produce a laminated transparent window as described above except that it is curved.

Throw-away thin glass sheet 104 is used between layer of glass 105 and mold surface 99 to preserve glass layer's 105 optical quality. A problem with using throw-away thin glass sheet 104 between outer layer of glass 105 and mold surface 99 is that throw-away glass sheet 104 sometimes fractures during the molding process. These fractures may transfer to glass layer 105 during the curving process and harm its optical quality. Alternatively, mold surface 99 is rubbed with a thin layer of mineral powder 103 such as talcum powder. Mineral powder 103 permits glass layer 105 to slide upon and conform to mold surface 99 without adhering to it. Alternatively, a fiberglass cloth or other pliable heat resistant material is placed on mold surface 99 to permit the molded layer to slide on mold surface 99. This eliminates the need for throw-away thin glass sheet 104 and the problem of throw-away thin glass sheet 104 sometimes fracturing during bending and transferring its fracture lines to glass layer 105.

Glass layers bend at approximately 1172°–1200° Fahrenheit. Polycarbonate layers bend at approximately 277°–325° Fahrenheit. Use of the vacuum and pressure autoclave methods described herein permit bending at lower temperatures than possible without the vacuum and pressure. Glass layer 105 and polycarbonate layer 109 are preferably bent separately. Use of the methods described above are particularly useful in enabling the use of a polycarbonate inner layer with a hard surface coating on it from the beginning.

Figure 4C:
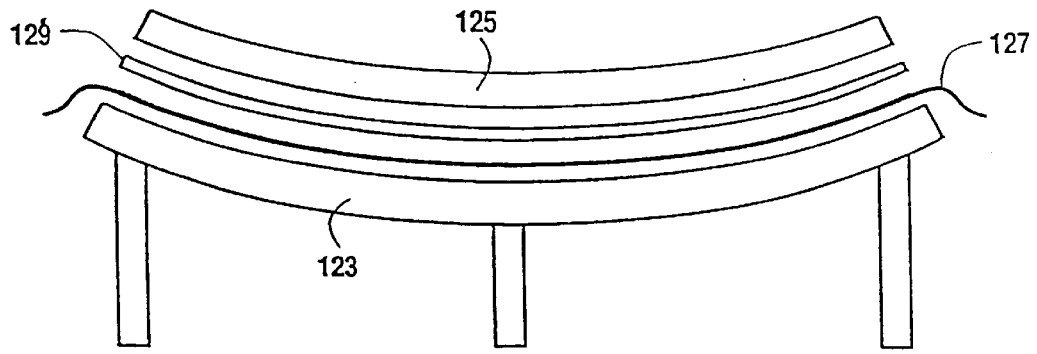
FIG. 4C shows a method of bending a layer on a steel mold.

Alternatively, FIG. 4C shows a method of using a steel mold 123 with a curved upper surface to curve glass or composite layers. Steel mold 123 is shaped to the curve desired for layer 125. Fiberglass cloth 127 or other pliable heat resistant material is put on steel mold 123. A throw-away layer 129 of glass or polycarbonate as appropriate is placed on fiberglass cloth 127 glass or polycarbonate. Layer 125 or layers to be curved are placed on top of throw-away layer 129 and the collection heated in an autoclave as described above. Steel molds 123 are less expensive to make and maintain than ceramic molds. They are primarily useful for smaller windows such as sidelights because steel's expansion characteristics are substantially different from those of glass. Ceramic mold 101, while having other limitations, is more useful for bending larger layers than steel mold 125 because ceramic mold 101 is not as thermally affected.

Figure 5A:
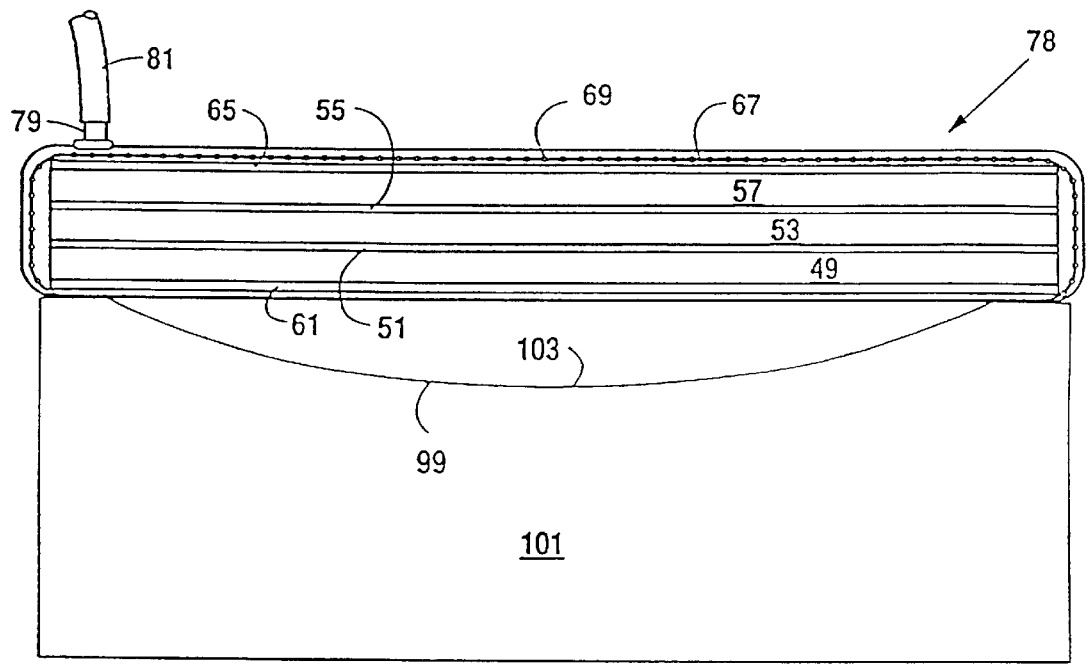
FIG. 5A and B show an alternative method of making curved laminated ballistic-resistant window.
Figure 5B:
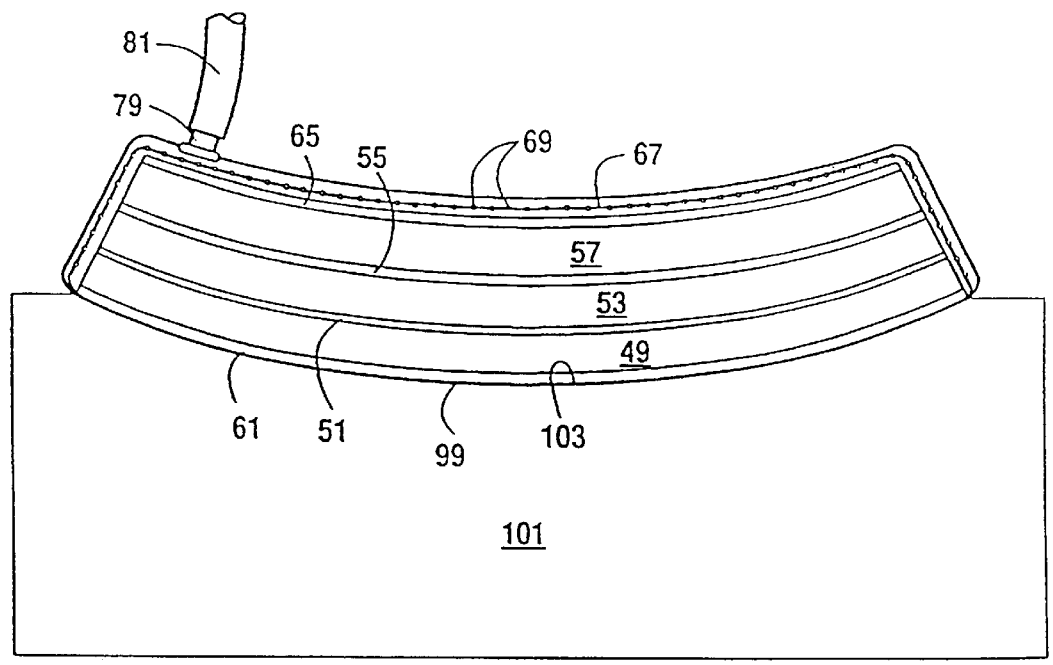

A single desired layer or any combination of multiple layers of glass, polycarbonate, or other composite are cut to size, layered upon each other and bent on mold 101 to the desired curvature as shown in FIGS. 4A and 4B, or 4C, or 5A, and 5B. In an alternative single step method the above layers are prepared within high temperature vacuum bag 78 as described above, high temperature vacuum bag 78 and contents placed in an autoclave on ceramic mold 101 as shown in FIG. 5A and the same heated and acted on as described above to produce a curved laminated window as shown in FIG. 5B.

The outer glass layer may be sized to present a lip capable of fitting in a window frame to hold an armored window.

Edge Cap

Transparent armor used to replace an OEM window is typically thicker than the replaced OEM window. In the prior art, accommodating a thicker armored window within a retrofitted standard vehicle typically required replacing the OEM window frame with a wider window frame. This requires substantial modification of the vehicle and labor intensive body work. Such modifications are shown in U.S. Pat. No. 4,336,644, particularly FIGS. 2, 3, 5–9, and 19–22. A further problem with prior art laminated transparent armor is that, over a period of time, the layers sometimes delaminate due to edge stress and moisture or air getting between layers.

Figure 6:
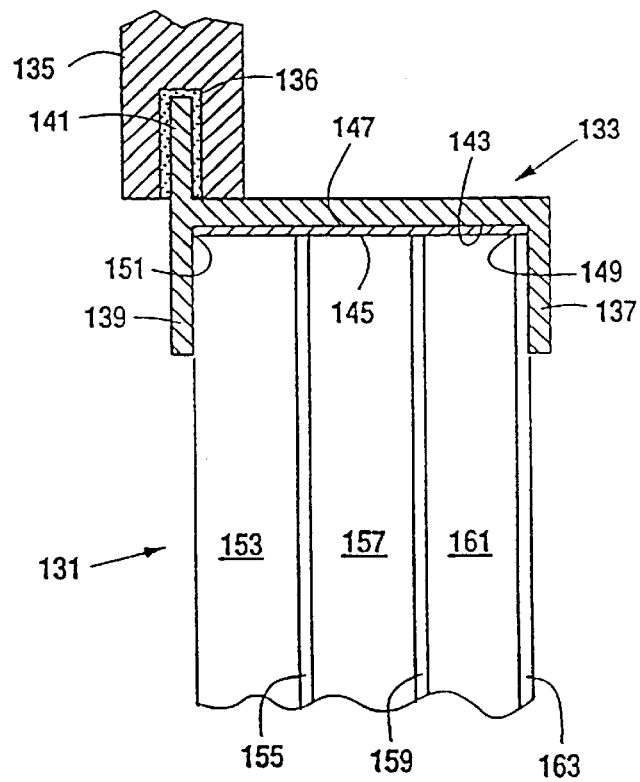
FIG. 6 shows a cross-section of an outer frame for an armored windshield showing the edge cap for adapting the armored windshield to fit within the original windshield frame of the automobile.

FIG. 6 shows a cross-section of an armored window 131 showing edge cap 133 for adapting the armored window 131 to fit within the automobile's original window frame 135. Edge cap 133 is as thick as needed to hold armored window 131 and preferably ⅛ inch thick. Both inner lip 137 and outer lip 139 are approximately 0.75 inches long or more or less as required to securely hold the armored window. The length of the edge cap base 147 varies according to the thickness of the armored window. This varies from ¾ of an inch for UL II armor to 2 inches for UL IV armor piercing armor or more or less as may be required to securely hold the armored window 131. Protruding lip 141 has a thickness approximately the same as the thickness of the OEM glass it replaces and fits securely within the OEM window frame or channel 135 and window frame sealant 136. Protruding lip 141 has a length which, when combined with the length of armored window 131 and the protruding lip or other opposing surface on the opposite end of the armored window 131, causes the over all length of the armored window 131 encapsulated with the edge cap 133 to have approximately the same length and height dimensions as the OEM window it replaces. Protruding lip 141 thus fits within the window frame 135 with approximately the same fit and dimensions as the OEM window did. Armored window 131 encapsulated with edge cap 133 is thus securely held within the vehicle's OEM window frame 135. If the OEM window was held within frame 135 with a sealant 136 then protruding lip 141 may be sized to also accommodate sealant 136 or be sized to securely fit within window frame 135 without sealant 136.

In the prior art, armored windows installed into retrofitted vehicles are typically sealed directly to the retrofitted expanded window frame with silicone. Prior art methods typically do not apply silicone until it is used to seal the armored window into the vehicle's expanded window frame. The silicone is useful because it is slightly flexible, seals the armored window's edges from air and moisture and can be cut with a blade to remove the armored window if needed. Silicone, however, gives off fumes during curing which may be incompatible with the interlayers and adversely affect the armored window.

FIG. 6 shows urethane layer 143 holding edge cap 133 to armored window 131. Urethane cures harder than silicone and has fewer incompatibility problems with interlayers 155, 159 than silicone. Urethane sealant has superior strength, durability and ability to keep out air and moisture than silicone and most other common sealants. Placing urethane layer 143 about the outer edge of laminated armored window 131 soon after armored window 131 is made and before it is installed helps protect the interlayers 155 and 159 from atmosphere and moisture. Edge cap 131 is promptly sealed about the outer edge of armored window 131 with urethane layer 143 to completely encase armored window 131 within a protective urethane and metal shield. This protects armored window edges 149 and 151, and protects against air and moisture entering between layers and interlayers 153, 155, 157, 159 and 161. Edge cap 133 distributes the weight of the bullet resistant window 131 over the full length of the armored window's outer surface 145 rather than just parts of the armored window's outer glass edge as in prior art mounting methods. This creates a more stable and long lived mounting. The ability to pre-manufacture and store components is a useful element in efficient manufacture of lightweight armored vehicles. The disclosed edge cap 133 permits armored window 131 to be premanufactured and stored or shipped for later use as needed.

Figure 7:
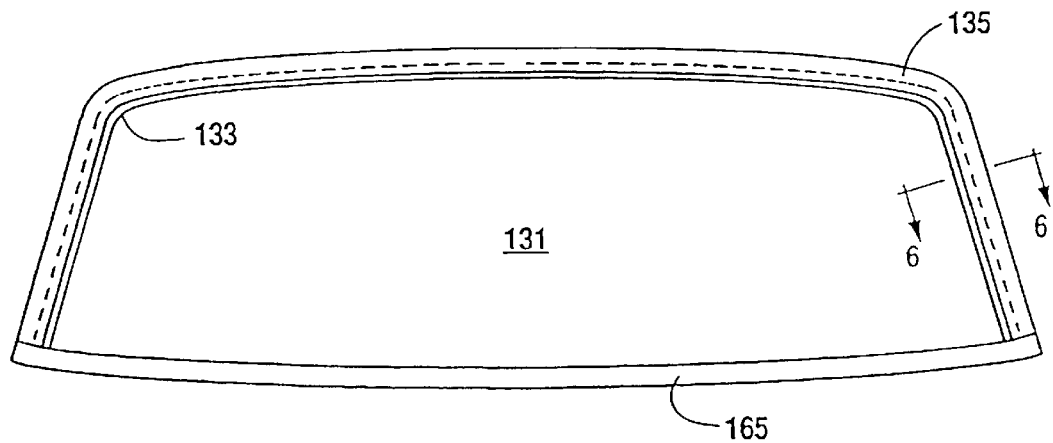
FIG. 7 shows an armored window held by its edge cap within the original window frame of an automobile.

FIG. 7 shows an armored windshield 131 held by edge cap 133 within an automobile's original windshield opening 134. Armored windshield 131 is encapsulated on the upper, left and right sides by an edge cap 133 as described above. Bottom edge cap 165 may have a flat outer surface or other configuration as needed to fit within the armored vehicle without altering the armored vehicle's frame or requiring external body work.

For armored window sidelights the upper, left and right sides each have edge capping 133 as described above which fits within the OEM side light channels and frames. Edge cap bottom 165 may have a flat outer surface to fit the window regulator mechanism.

The edge cap 133 completely encases the outer edge of armored window 131. It may be comprised of a single segment, an upper segment and a lower segment, two side segments, or any other convenient way of encasing window 131 within edge cap 133. The edge cap 133 ends or its segments ends may be attached to corresponding opposite ends at the window's corners, middle of the top and bottom, or any other convenient points of attachment. The ends may be attached by screws, snap-in attachment means, welding or other attachment means.

A problem confronted in selecting proper materials for edge cap 133 is that the outer edges of windshields and sidelights in many modern vehicles bend in more than one dimension. Edge cap 133 must be sufficiently flexible to be capable of bending about these different angles without breaking or cracking. Edge cap 133 must also, however, be hard enough to resist high velocity projectiles. Thus, the material used to construct the edge cap 131 must be both sufficiently soft to bend and stretch about the curves, angles, and corners of the armored window 131 and sufficiently hard for ballistic purposes.

A malleable soft aluminum type 6061 to 6062 aluminum with T2–3 hardness is preferably used in the edge cap 133's initial manufacturing phase. This material is extruded in a size and shape capable of fitting about the armored window 131 and within the vehicle's OEM window frame 135. Edge cap 133 is stretched and bent to the appropriate configuration to securely fit about armored window 131. After edge cap 133 has been shaped into the proper configuration it is heated in an oven to increase its hardness. A preferable temperature and time is in the range of 400°–500° Fahrenheit, preferably approximately 450° Fahrenheit for approximately two to four hours. This changes the quality of the aluminum edge cap 133 components from T2–3 hardness to a range of T6 to T9 hardness, preferably approximately T7–8 hardness. T6–9 hardness preferably T7–8 hardness, is satisfactory for ballistic purposes. The edge cap 133 components are finished either by anodizing or coating it.

Moveable Sidelights

Figure 9:
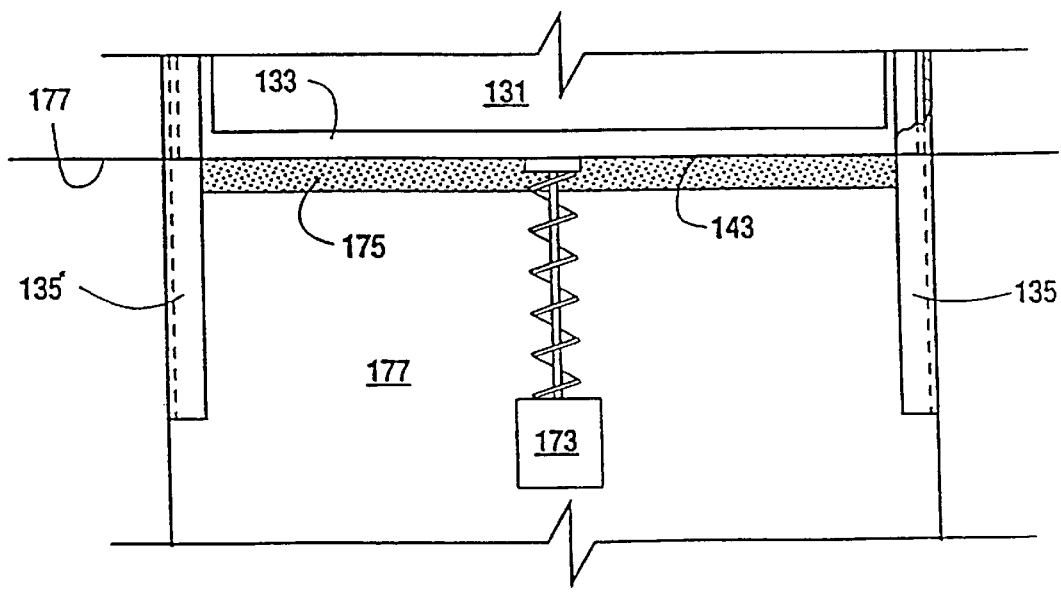
FIG. 9 shows the bottom of an armored sidelight.

Prior art armored sidelights fitted into standard vehicles retrofitted to be armored vehicles typically could not be raised or lowered. An invented UL III sidelight window is sufficiently light that if it is encased within the described edge cap 133 and edge cap protruding lip 141 is inserted into sidelight channel 135, as shown in FIG. 9 and the OEM regulator motor is replaced with a stronger regulator motor 173 and the sidelight opening enlarged on top of the inside door panel, armored sidelight window 131 can be raised and lowered.

For thicker armored sidelights, such as NATO III level sidelight windows, the vehicle's bottom weather and soundstripping is removed to accommodate the larger armored window 131. A soundproofing material 175 such as plastic sponge is attached to edge cap bottom 143. The soundproof material 175 seals against the bottom surface of the upper portion of door 177 when the window 131 is raised fully to seal against outside noise and weather.

Alternatively, the armored sidelights with edge cap 133 are removably installed in a closed position.

Figure 8:
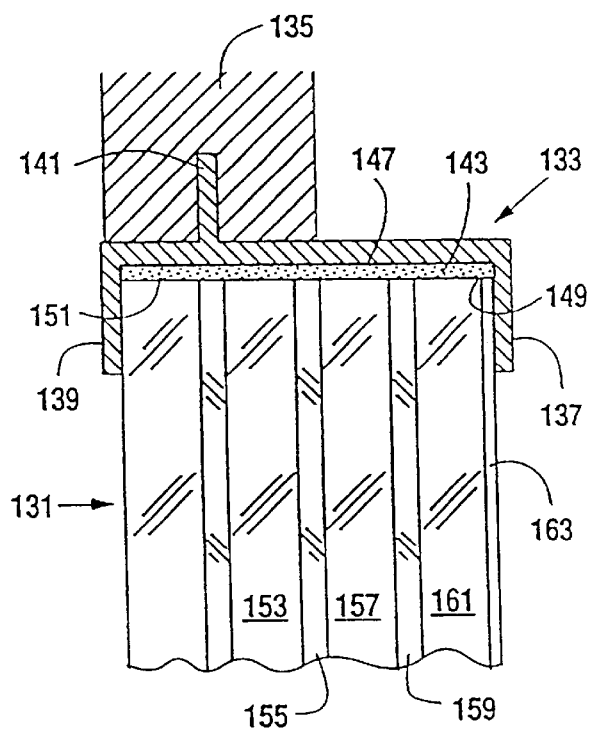
FIG. 8A shows a cross-section of an armored window installed within the original window frame.

FIG. 8 shows that protruding lip 141 can be positioned any where along edge cap 133 as may be useful. Prior art transparent armor was typically permanently fixed to the vehicle and difficult to replace when damaged or scratched. Transparent armor installed with edge cap 133 can be removed for repair or replacement.

Break-In Resistant Glass

Figure 10A:
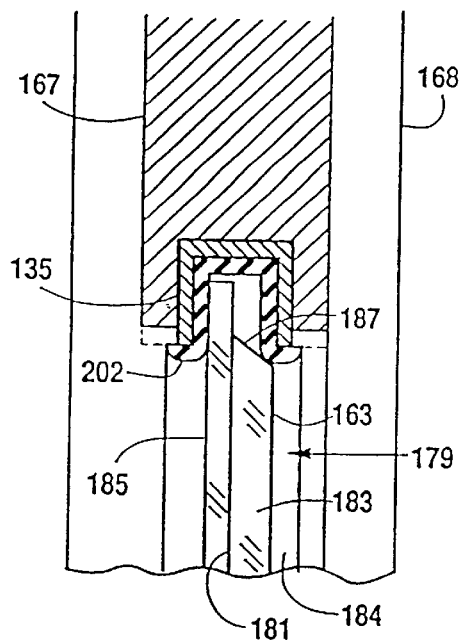
FIG. 10A shows a cross-section of a break-in resistent sidelight installed within an original sidelight frame.

FIG. 10A shows a cross-section of a break-in resistant sidelight 179 installed within an OEM sidelight frame 135 attached to door frame 167 of door 168. Break-in resistant window 179 is prepared by adding a 0.050 interlayer of polyurethane 181 and a 1/16 inch to 1/8 inch layer of resilient, translucent material such as polycarbonate 183 to an OEM sidelight 185 or a glass layer sized and shaped like an OEM sidelight 185, typically of 1/8 inch thickness when intended for use. In an OEM automobile sidelight frames the polyurethane layer may usefully vary from 0.050 to 0.080 and the glass layer may usefully vary from 1/16 inch to 1/4 inch. A hard surface coating 163 is on the inboard surface of polycarbonate layer 183. The left edge 187, upper edge and right edge of polycarbonate layer 183 are angled to produce tapered edge 187. Break-in resistant window 179 with tapered edge 187 is accommodated within OEM window frame 135 and OEM weather stripping 184 and 186. The slopes of tapered edge 187 are angled between 25° and 60° as necessary to accommodate some of polycarbonate layer 183 within OEM window frame 135, 45° being the preferred angle. OEM car door frame 189 holds OEM-sidelight frame 135.

Tapered edge 187 is produced by sanding or routing polycarbonate layer 183's edges with a mechanized sander or router. Routing is preferably accomplished before lamination and bending. After lamination and bending final smoothing is accomplished by sanding or flame polishing. If the glass layer 185 is not OEM tempered glass its edges can also be tapered.

Figure 10B:
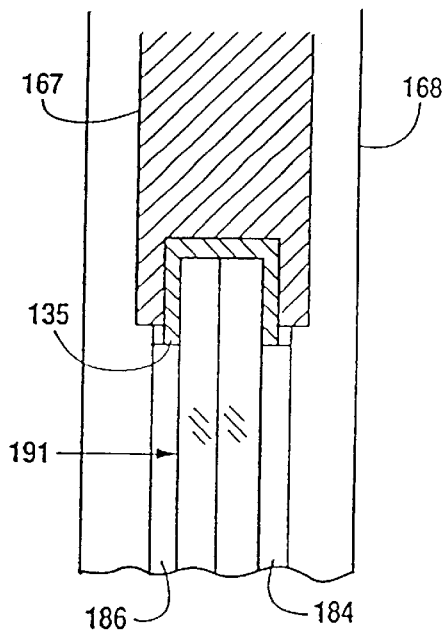
FIG. 10B shows an alternative version of a break-in resistant sidelight installed within an original sidelight frame.

FIG. 10B shows an alternative break-in resistant sidelight 191 installed within an OEM sidelight frame. The break-in resistant sidelight 191 is accommodated within the preexisting OEM sidelight frame 135 by trimming some or all of the window gasket 201 from within the OEM sidelight frame 135. If the window's bottom weather stripping 184 or 186 needs to be trimmed to accommodate the break-in resistant window 191 necessary trimming is completed on the inside weather strip 184 to the extent possible. This leaves the outer weather stripping 186 unaffected and the outside view of vehicle 1 unchanged.

Figure 10C:
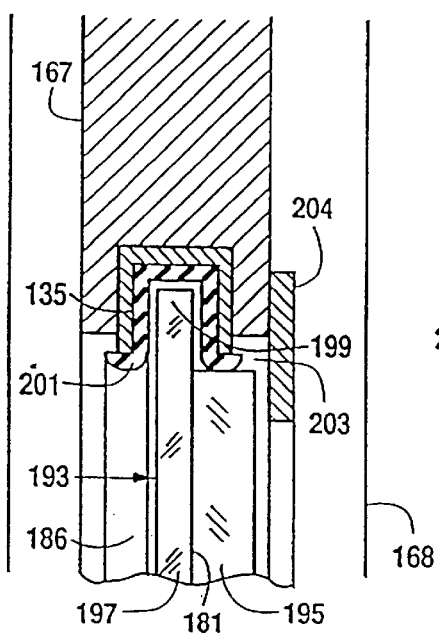
FIG. 10C shows an alternative break-in resistent window installed within an original sidelight frame.

FIG. 10C shows an alternative break-in resistant window 193 installed within an OEM sidelight frame 135. A 1/16 inch or thicker polycarbonate inner layer 195 is added to the OEM sidelight or OEM shaped glass layer 197. Polycarbonate layer 195 is approximately 1/4" shorter on the top, left and right sides than the glass layer 197. This leaves an approximate quarter inch glass lip 199 about the edges of break-in resistant window 193. Lip 199 fits within the OEM sidelight frame 135 and window gasket 201. If a thin polycarbonate layer 195 is used then removal of the door's inner bottom weather stripping 184 will accommodate break-in resistant window 193. A thicker polycarbonate layer 195 requires modification of door 177 by removing a sufficient part of the door's upper surface 203 to accommodate break-in resistant window 193. An alternative configuration includes the addition of either an opaque or transparent armored lip 204 to the inner surface of the vehicle's door. The lip may be sized to closely fit any desired window frame or window channel.

The designs of FIGS. 10A, 10B and 10C may be combined and adapted to fit other frames on either an original manufacture or retrofitting basis.

The glass layer in the break-in resistant window 179, 191, or 193 may shatter if struck by a heavy projectile such as a hammer or pipe which is thrown or wielded by a person. Polyurethane interlayer 181, however, causes the shattered glass layer to adhere to the polycarbonate layer. The break-in resistant window therefore will typically not shatter or break under such blows, the glass layer spreading the impact energy over a portion of the polycarbonate layer and the polycarbonate layer bending to absorb the impact energy. The break-in resistant window is difficult to penetrate by cutting or sawing because the outer glass layer protects the inner polycarbonate layer from pointed objects and sharp edges and the polycarbonate layer absorbs energy by bending and holds the glass layer to deter cracks in the glass from propagating. The break in resistant window 179, 191 and 193 is thus capable of resisting most break-in attempts by persons wielding objects such as hammers, pipes, glass cutters, etc.

The invented break-in resistant windows and methods of installing the same are taught away from in the prior art in spite of long felt market need. Prior art armored windows are designed to stop high velocity projectiles such as bullets or to prevent shattering of glass into the passenger compartment by using a sheet of flexible interlayer material which is too thin to resist repeated heavy blows or glass cutting. The invented break-in resistant glass may not stop small high velocity incoming projectiles, but does not suffer from the demands of being designed to stop them. The break-in resistant glass additionally helps insulate the passenger compartment from outside noise and protects the vehicle's occupants from injury in the event of a side impact vehicle collision. Polycarbonate layer 183 protects against the sidelight deforming with jagged edges into the passenger compartment.

Opaque Armor

Prior art armorers often armor a vehicle by attaching steel plates to the inner surfaces surrounding the passenger compartment. To accommodate curved inner surfaces, numerous small steel plates are welded together and to the vehicle. Welds are weakener than steel plates. If such a vehicle is impacted with explosive force, the steel plates may separate from the vehicle and each other and explode into the passenger compartment.

Other prior art armors stuff flexible ballistic material into the vehicle's hollow frame elements and use flexible woven armor against curved portions of the vehicle interior and flat rigid armor where the same can be installed. This is described in U.S. Pat. No. 4,336,644, particularly FIGS. 4, 10–14.

Figure 12:
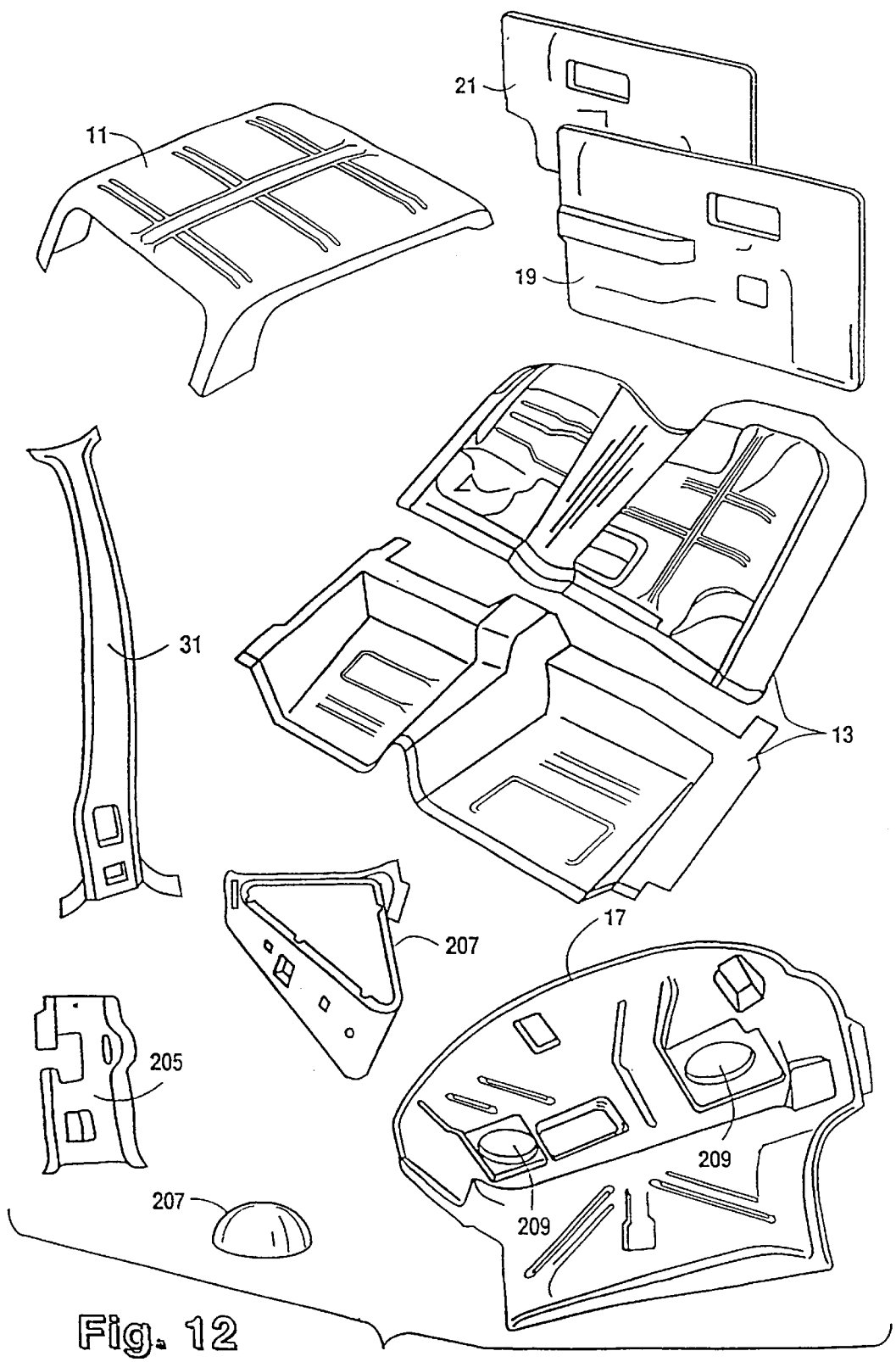
FIG. 12 shows an assembly of opaque armor for retrofitting a standard passenger automobile.

The invented opaque armor is comprised of ballistic cloth molded into rigid sheets which fit closely against the vehicle's inner surfaces. The process of making rigid molded armor begins with making plugs, preferably of a fiberglass and epoxy admixture, against each inner surface of the example vehicle to be armored. FIG. 1, in addition to showing a view of installed armor, also illustrates making such plugs against the desired inner surfaces of vehicle 1. The resultant molding surface of each plug mirrors the inner surface of the portion of the vehicle the plug was molded against. The inner surface of each completed plug is lightly treated with a non-stick coating such as wax or oil and used to prepare an armor mold using the mold preparation methods discussed above. The several resultant armor molds are used to mold the described opaque rigid armor elements 11, 13, 15, 17, 19, 21, 205 and 207 shaped to match described plugs. FIGS. 1 and 12 both depict plugs produced by being molded against inner surfaces of vehicle 1 and of rigid molded armor elements, roof plug and roof armor 11, floor plug and floor armor 13, front plug and front armor 15, rear plug and rear armor 17, right front side plug and right front side armor 19, right rear side plug and right rear side armor 21, right door frame plug and right door frame armor 31, right front door frame plug and right front door armor 33, shift plate plug and shift plate armor 205, and speaker cover plug and speaker cover armor 207. Molds are made from these plugs and armor made from the molds as described herein.

This process makes overlapping preformed rigid armor components corresponding to all opaque inner surfaces of the passenger compartment. The resultant rigid molded armor elements 11, 13, 15, 17, 21, 205 and 207 thus fit closely against the corresponding inner surfaces of vehicle 1. Further, the opaque armor molds may be used to produce many multiples of additional sets of rigid molded armor which will fit closely against the inner surfaces of many additional vehicles of the same style as vehicle 1. This permits stockpiling of needed components and eliminates ad hoc trimming of armor to fit.

The rigid molded opaque armor elements overlap other rigid molded opaque armor elements, the vehicle's frame and the described transparent armor to completely protect the passenger compartment. For example, speaker armor 207 protects the speaker holes 209 in rear armor 17. Other such additional rigid molded opaque armor elements are molded and installed as needed. The opaque armor may be fixed to the inner surfaces of vehicle with a sealant such as urethane, or riveted to the vehicle, or both. Alternatively, it may be removably attached with removable attachments such as bolts and nuts. The vehicle's OEM interior fixtures are installed on the interior side of the armor.

The rigid opaque armor is preferably comprised of layers of woven ballistic cloth such as fiberglass, 24–36 ounces per foot E glass manufactured by Kytex or "S" glass or "S2" glass such as manufactured by Owens Corning, or any combination of high tensile strength fibers including, without limitation, such metal, Kevlar, graphite, metallic glass, or similar fibers, prepared with an oil starch binding impregnated with a resin catalyst mixture. Prior art rigid sheets of woven ballistic cloth are described in U.S. Pat. No. 4,336, 644. The invented rigid armor is formed of layers of woven ballistic cloth upon the mold hardened with a resin that sets by heat and time rather than time only. The preferred resin hardener such as isopropyl or polyester resin hardens in 2–15 minutes, at a range of 150°–200° Fahrenheit approximately 175° Fahrenheit, and is compatible with the ballistic cloth chosen. This gives better control over the manufacturing process.

Alternatively, the rigid armor may be comprised of any material which may be formed into curved, rigid, ballistically-resistant sheets shaped and sized to fit against curved, interior surfaces of a structure being capable of making prefabricated sets of such armor having prefabricated sets of such armor on hand speeds retrofitting of vehicles to be armored.

Where desired, one or more layers of ceramic material and additional layers of woven fiberglass, all rigidly formed with the resin-catalyst mixture are used. Better control over when the resin impregnated woven fiberglass layers harden permits more convenient incorporation of tile and other hard components into the woven layers to produce curved rigid unitary armor. The impregnated layers are encased in high temperature breathable teflon sheeting, encased in a vacuum bag and heated in an autoclave while subjected to negative pressure, all as described above. The high temperature vacuum bag and contents are heated in the autoclave for thirty minutes to 1.5 hours, preferably approximately 1 hour, at a range of 115°–200° Fahrenheit, preferably approximately 175° Fahrenheit, at approximately 115–135 pounds per square inch. The pressure squeezes the resin between the fiberglass layers and sets the fiberglass into a compressed composite state. The heat cures the fiberglass and resin catalyst and tiles together to form a single rigid armored layer. The cured armor is removed from the mold.

Figure 11:
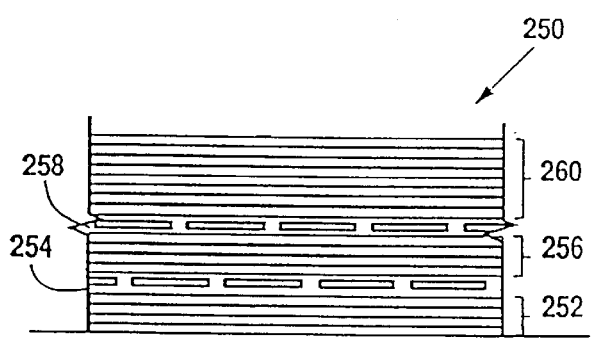
FIG. 11 shows a cross-section of rigid opaque armor with ceramic inserts.

Many layers of ballistic cloth, supplemented if desired by layers of tile, can be combined to create different levels of protection against incoming projectiles. FIG. 11 shows a preferred configuration for rigid opaque armor 250, an outer layer of four plys of woven fiberglass 252, a first layer of tile 254, an inner layer of four plys of fiberglass 256, a second layer of off-set tile 258, and an inner layer of sixteen plus plys of fiberglass 260, all rigidly held and compressed within a hardened resin catalyst admixture.

An advantage of using pressure to compress the fabric layers during manufacture is that the resultant armor is thinner and thus fits more readily into the uses described herein, harder and thus more ballistic resistant and more resistant to delamination and that the checkerboard pattern of the tile layers 254 and 258 is apparent from indentations in the layers of fabric 252 and 260 reflecting the checkerboard spacing of the individual tiles. The latter assisting quality control.

Prior art high tech ballistic tiles such as manufactured by Coors and Norton are expensive, typically comprised of heavy dense materials, shatter when hit and do not adhere well to ballistic cloth/resin layers. While ballistic tile may be superior to standard commercial grade tile in withstanding the impact of a single projectile it often fractures and shatters and upon being hit and thus subsequent impacting projectiles are not defeated by ballistic tile. The invented armor uses standard commercial grade tile from ¼ inch to ½ inch thick and sized from 1 inch by 1 inch to 4 inches by 4 inches. Commercial grade standard tile is inexpensive, adheres to ballistic cloth resin layers better than ballistic tile, fractures less than ballistic tile, and weighs less than ballistic tile.

Incoming projectiles push through outer ballistic cloth layers and are only slightly deformed and slowed by outer ballistic cloth layers, as compared to the ceramic armor behind them. The prior art, therefore, typically concentrates on ballistic tile to deform the incoming projectile and on ballistic layers behind the ceramic armor to spread the deformed projectile's force through delamination; all to the exclusion of "wasting" exterior woven layers in armor design. Prior art armors thus typically use only one or two plys of outer protective layers over their ceramic armor layers. While this may be appropriate for defeating a single projectile, securely adhering a more substantial number of rigid ballistic layers to the front of the ceramic armor layer, as disclosed herein, decreases tile fracturing, shattering, and bubbling caused by initial and subsequent projectiles. Keeping the tile armor in an unfractured, unshattered, and unbubbled condition makes the tile armor more likely to be effective against subsequent incoming projectiles.

Further, an incoming projectile may shatter an entire piece of ceramic armor. The invented armor preferably uses layers of one inch square commercial grade tile on a flexible, plastic fish net backing to create tile layers 254 and 258. The projectile, therefore, shatters only one small piece of ceramic armor, leaving the many other adjacent pieces of tile intact to defeat subsequent incoming projectiles. Using numerous small tiles in multiple overlapping layers thus produces a more efficient armor barrier against subsequent projectiles than fewer larger thicker tiles. Because subsequent incoming projectiles may hit close to the prior projectile's impact but likely not exactly at the prior projectile's impact point.

Further, large ballistic tiles used by prior art armors may crack due to crash impact, potholes, etc. when used in vehicles. Use of many small tiles on a vibrating platform such as an automobile decreases the likelihood of tile cracking due to mechanical stress. Further, while tiles of up to 4 inch×4 inch squares can be used where the armor has no or little contour smaller tiles such as 1 inch×1 inch can be more readily used to mold layers curved tile armor where the contours of the interior surface of the vehicle 1 require it. The plastic fish net backing attached to the tiles is particularly helpful in speeding manufacture and maintaining tile to tile spacing quality control while making curved armor as described herein.

Ceramic armor is particularly useful against white phosphorous projectiles because it will not burn. This is an advantage over steel armor, which white phosphorus will burn through.

Roof armor 11 is molded to fit the inner surface of vehicle's roof and typically replaces the approximate ½ inch sponge spacer found between the roof and the roof liner. This greatly speeds the installation and retrofitting process as no alteration of the roof area of vehicle 11 is needed.

An alternative or additional layer of roof armor can be prepared by peeling the OEM roof liner fabric off of the OEM roof liner and replacing the OEM roof liner with molded roof armor 11. The roof armor is typically comprised of an outer layer of four-plys of fiberglass, tile and an inner layer of six-plys of fiberglass and sealed to the roof.

Front and rear side panel armor 19 and 21 is prepared by replacing the press board of the OEM door panel with molded armor sized and shaped to fit closely to the inboard surface of the door. The OEM door panel fabric is peeled off the OEM door panels and attached to side armor 19 and 21. This eliminates the necessity of cutting vehicle's doors open to receive armor. Alternatively or additionally, the doors are cut in half and overlapping halves of side armor are scaled against the inner surface of the outer skin of vehicle 1's door and the door reassembled. In UL IV vehicles, the door frames are cut open to receive side armor having internal tile layer or layers.

To retrofit a standard vehicle to UL IV level armor, the floor armor 13 is typically comprised of an outer layer of two to four plys of ballistic cloth, a layer of tile, and an inner layer comprised of eight to twelve-plys of ballistic cloth, all molded and cut to fit against the floor of vehicle 1, and under vehicle 1's carpet. Floor armor 13 is preferably manufactured in overlapping front and rear halves to facilitate manufacture and installation. Floor armor 13 is pre-drilled and cut to accommodate seat mounting bolts, etc.

The opaque armor is manufactured in a department equipped with pre-measured jigs, water jets, mold-making booths and molds. Rigid molded opaque armor prepared in this manner can be pre-drilled and cut with a water jet to prepare it for installation into the vehicle. Cutting the opaque armor with a water jet is preferable to prior art cutting methods because it eliminates flying fibers, is more efficient and gives more exact dimensions, all necessary items for cost efficient volume manufacture and fitting together of prefabricated parts.

The fuel tank armor 25 is pre-molded and scaled against vehicle's fuel tank. The described fuel tank armor may be usefully placed about fuel tanks other than those as shown in FIG. 1. Side mounted fuel tanks may be either originally manufactured or retrofitted with such fuel tank armor. An optional additional component of fuel tank armor is inclusion of a pliable layer, such as rubber which is somewhat self-sealing in the event the fuel tank armor is ruptured.

To the extent possible, all possible avenues for projectiles to enter the passenger compartment or harm the vehicle's maneuverability are blocked by either transparent or opaque armor in combination with the vehicle's frame and structure.

The invented process permits a standard, full-sized, passenger vehicle to be retrofitted to be armored to NATO Level III with less than approximately 900 pounds of armor and to NATO Level IV with less than approximately 100 pounds of armor. Multipurpose vehicles may be armored to NATO Level IV with less than approximately 800 pounds of armor. The interior furnishings fit over the opaque armor so that armoring of the vehicle is not readily visible.

The invented opaque armor is sufficiently lightweight to provide ballistic protection to a vehicle with less than half the weight of current standard metal plate armor used to retrofit vehicles to have equivalent NATO armor level ballistic protection. For example, a current standard metal plate armor package capable of providing NATO Level IV protection to a standard full-sized vehicle typically weighs about 2,800 pounds, while the invented armor package providing equivalent protection can weigh less than 950 pounds. The separate invented opaque armor units each weigh less than half of what its corresponding ballistically-equivalent current standard metal plate armor unit weighs. The invented opaque armor is usefully lightweight armor if it weighs one-quarter less than current standard metal plate armor which provides equivalent NATO level ballistic protection.

Assembly

The above components permit the retrofitting automobiles to be lightweight armored vehicles by dismantling the automobile's interior furnishings of automobiles, modifying the automobiles to accept armor, installing the armor and reinstalling the furnishings all in a cost effective manner. Prior art methods of retrofitting vehicles were labor intensive because they did not employ the many cost saving inventions disclosed herein. Use of the production methods described herein to produce the armor described herein permits standard vehicle to be retrofitted into an armored vehicle within fifty man hours. This is substantially more efficient than prior art methods of retrofitting standard vehicles.

A predicate for the method is pre-production of the armor and mountings as described above. The armor components are each labeled with identifying information during the manufacturing process. The labels are placed to be visible for inspection and photographing after installation for quality control purposes. The armor is manufactured, labeled and collected to match the vehicle to be retrofitted before disassembly of the vehicle begins.

a. Stage one

When a standard vehicle arrives for armored conversion its place of origin, outer color, interior color, make and model, vehicle identification number (VIN) of vehicle, manufacturer's identification number for paint and interior color, etc. are recorded. A physical inspection of the vehicle is conducted with a pre-printed inspection list. Pre-inspection includes testing electrical switches and buttons and inspecting the interior trim for any flaws in materials used or fit.

The vehicle is placed on an air lift cart which permits the workers to vertically raise and lower the cars at will. Interior furnishings including seats, inner door panels, side lights, door lock assemblies, locking mechanisms, side light motor and regulator, door bar, battery, windshields, side windows, urethane from around windshield frame, back light, urethane around back light, interior from the vehicle, kick panels, floor board carpet, installation board, headliner, etc. are removed in a predetermined order and placed on prearranged storage carts in a predetermined order. The carts are designed to hold all of the removed portions of the vehicle in a predetermined order. Vehicle furnishings which will visible upon reassembly are placed in protective bags. The storage carts containing removed parts, are covered to keep their contents secure and clean. The doors are removed and marked and placed on a manufacturing jig. If needed, the front and rear of the interior door frames are cut down on both sides from the edge using a high speed air cut-off saw. The gasoline tank and battery are removed.

b. Stage two

Preformed opaque armor components, as described above, designed and shaped to fit the interior contours of the vehicle are riveted or glued, to the vehicle's interior frame using pre-positioned armor and attachments found on the supply cart.

The armored headliner is positioned to fit within the car's molded grooves and sealed into place and riveting to the reinforcement rings in the vehicle's roof and side frame. Rear seat armor is sealed and riveted to the interior framing of the vehicle. Floor board armor, pre-drilled to fit over the vehicle's mounting bolts, placed over the pre-urethaned floor board and riveted to the vehicle's floor board frame. Pillar post armor is sealed and riveted to the inside of the pillar post and riveted to the pillar post. Kick panel armor is urethaned to the metal frame of the kick panels and riveted into place. Front windshield post armor is sealed and riveted into place. Fire wall armor is sealed and riveted into place. Battery armor is placed around the battery. Fuel tank armor is sealed and riveted around the dismounted gasoline tank and the armored gas tank remounted. Door armor is sealed and riveted to the interior skin of the doors and fastened into place through pre-drilled fastener holes.

c. Stage three

Transparent armor components, as described above, each encapsulated in an edge cap designed and shaped to have an outer lip which fits within the OEM channels of the window it replaces is installed. The front windshield and rear backlight window channels are filled with urethane. The front windshield and back light are placed into their respective OEM channels. The side lights are slid into their OEM channels and the window mechanisms refurbished. The vehicle's tires are removed, safety rollers inserted, the tires balanced and reinstalled. Photographs of the installed armor showing the armors identifying information are taken, the identifying information recorded and correlated with the vehicle.

d. Stage four

The vehicle's interior is reinstalled with the slight modifications required because of the armor added to the vehicle. Depending on the weight of the added sidelight armor, replacement stronger motors and regulators designed to mount on the original motor and regulator mounting bolts may be mounted on the OEM mounts and electrically connected. The door locking mechanisms are reinstalled and connected.

Pillar post trim and headliner molding are remounted with modifications as needed. Modified front windshield post trim adapted to attach directly to the armor is installed. Rear backlight panels are reattached. The vehicle's OEM carpet, OEM floor board kick panels and OEM molding are replaced with modifications as necessary. The seats are remounted.

Although the present invention has been described with respect to a preferred embodiment it is anticipated that those skilled in the art will recognize and could implement the invention in other embodiments which would still fall within the scope of described invention and the appendant claims.

The invented armor and break-in resistant glass may be prepared as OEM armor in vehicles designed to be armored and in stationary structures including, without limitation, bank teller booths, gasoline station type kiosks, offices, homes, and other buildings where security is desired, either in initial construction or replacement of original structure. The armor and break-in resistant glass inventions may be used as components in kits for use in retrofitting vehicles to be armored vehicles. The invented components are particularly adaptable to installation within standard vehicles at automobile dealerships as they fit within each standard vehicle type with a minimum of bodywork and structural changes. The described method of retrofitting a standard vehicle using the invented components is adaptable to retrofitting a vehicle at an automobile dealership. The invented components are suitable for inclusion in vehicles being originally manufactured.

The invented components are easily replaceable. This permits upgrading or downgrading a vehicle's armor or transferring a first vehicle's armor to a second vehicle when the first vehicle is worn out or damaged without damaging either vehicle. Such armor is more affordable and versatile than fixed armor particularly for fleet operators such as police departments which may purchase many vehicles of a single style, armor them, use them until they worn out, and then replace them with newer vehicles of the same style.

The invented side armor hardens the vehicle against side impact collisions. A problem with standard vehicles is that the door bar may fail and the crash impact intrude into the passenger compartment in the event of a side impact collision. Broad rigid impenetrable sheets of side armor support the door and hinder the door bar from entering the passenger compartment in the event of a side impact collision. The side armor and armored windows significantly strengthen the door and vehicle against side impact collisions.

Break-In Barrier

Unauthorized access to a vehicle is sometimes obtainable by slipping a long flat tool with a bottom hook, called a "slim-jim", between door edge 280 and door window 270, hooking the bottom hook about internal door locking mechanism 269 and pulling up on door locking mechanism 269 to open the vehicle door.

Figure 13A:
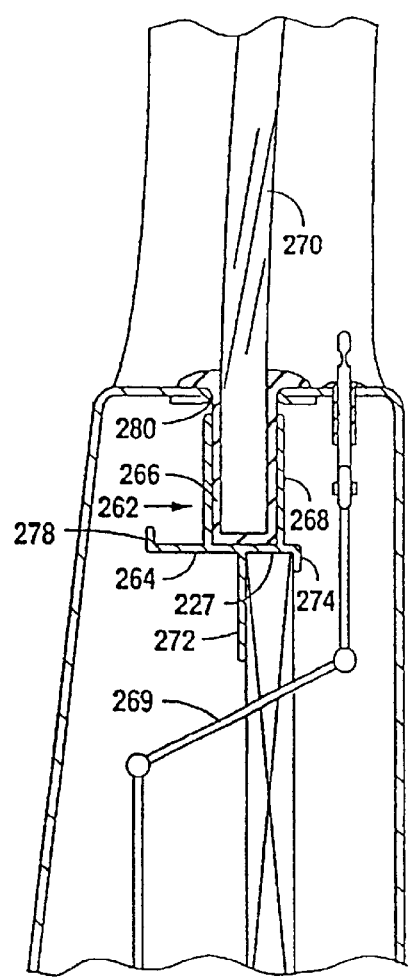
FIGS. 13A, 13B, and 13C show different views of the invented Slim Jim Barrier in perspective and as installed in vehicles.
Figure 13C:
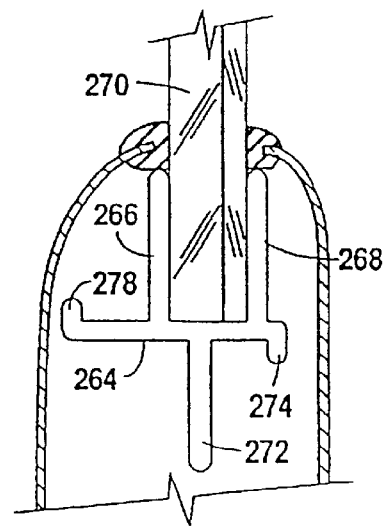
Figure 13B:
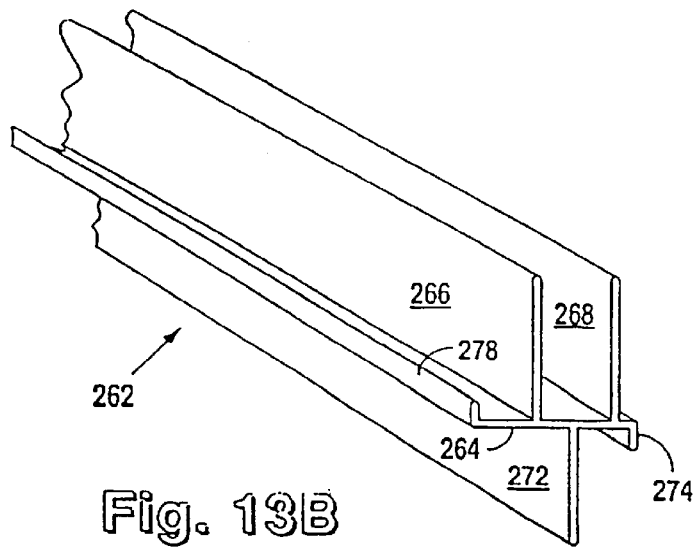

FIGS. 13A, 13B, and 13C show window retainer 262 with a break-in barrier. Upper prongs 266 and 268 hold window 270. Lower prongs 272 and 274 hold upper regulator bar 276. Barrier bar 264 projects outward from window retainer 262 terminating with lip 278. Barrier bar 264 and lip 270 are positioned, sized and shaped to defeat attempts to slide slim-jim type tools between door edge 280 and window 270 toward lock control mechanism 282. Slim-jim barrier 264 makes a vehicle more resistant to unauthorized entry, particularly in combination with a window 270 which is armored or break-in-resistant.

Ventilation Cluster

Vehicles typically have one or more holes about the passenger compartment for hoses to transmit heating and cooling fluids and for air circulation to and from the passenger compartment. Prior retrofitted armor uses a large hole in the armor to accommodate OEM hoses and pipes and an angled armored conduit to prevent projectiles from entering the passenger compartment. This requires laborious retrofitting.

Figure 14A:
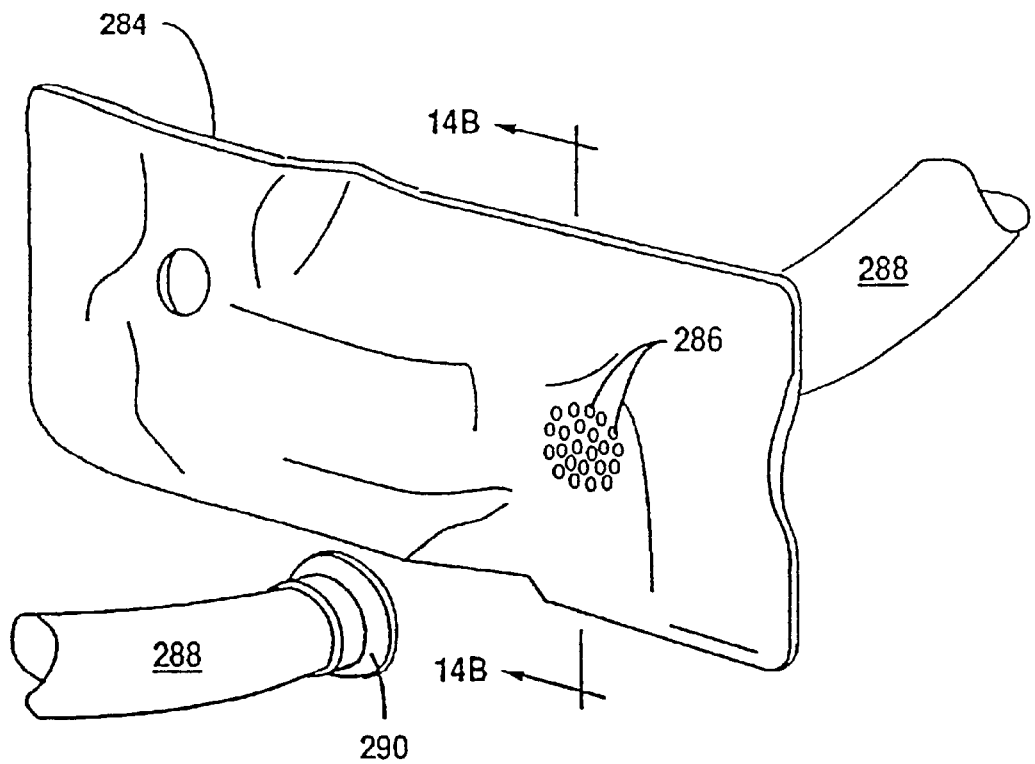
FIGS. 14A and 14B show an improved apparatus for heating and cooling the interior of a passenger compartment through a front firewall.
Figure 14B:
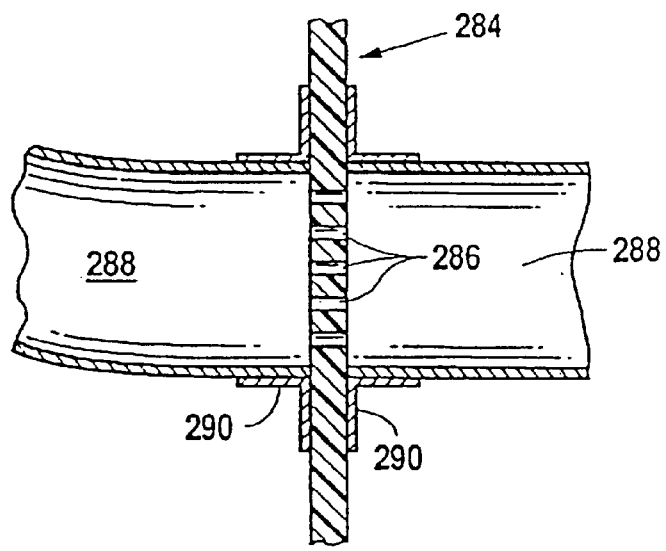

FIGS. 14A and 14B show improved rigid prefabricated molded firewall armor 284. Passage 286 is comprised of a cluster of small holes of sufficient size, number and spacing to permit sufficient circulation therethrough of air or fluid without defeating the ballistic integrity of the armor firewall in combination with the its hoses 288 and attachments 290 and the effect of blocking elements such as the vehicle's engine, structural components, etc. OEM hoses 288 are cut to fit against passage 286 and attached to hose holders 290. Hose holders 290 are sealed to either side of the improved armor firewall 284. This speeds retrofitting.

Armored Door

Prior art methods of retrofitting vehicle doors include flat steel armor or cut-to-size flexible ballistic cloth armor and armored windows which do not open and close. The vehicle door crash bar, sides and structural supporting members of the door prevent fitting a rigid unitary armor element through the inner side of the vehicle door to fit against and usefully armor the door's outer side.

Figure 15A:
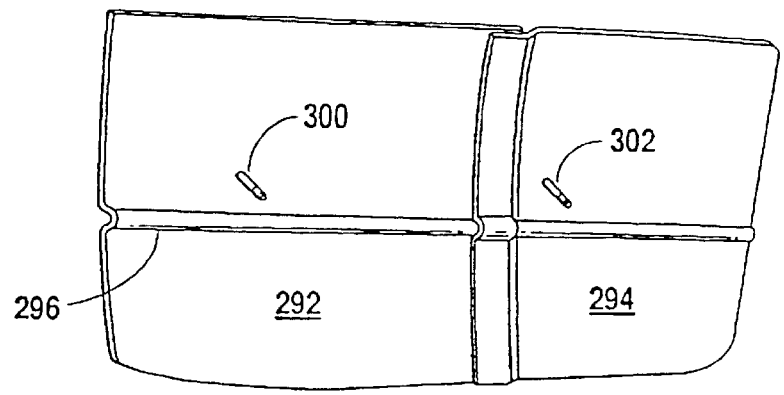
FIGS. 15A, 15B, and 15C show improved door armor in different perspectives and as installed in a door, together with an improved window regulator.
Figure 15B:
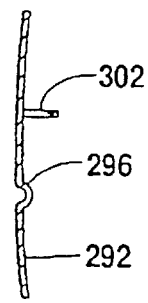
Figure 15C:
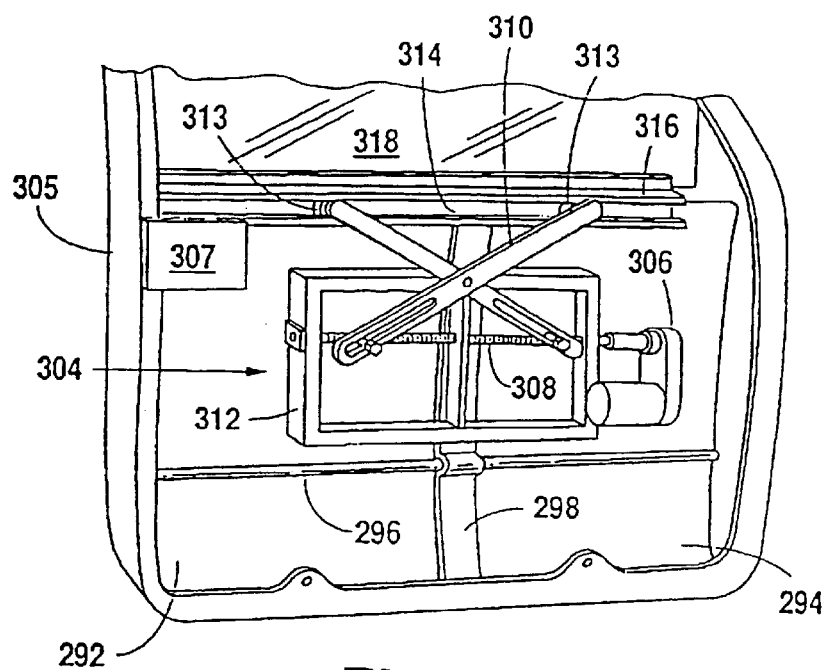

FIG. 15A shows improved door armor comprised of a curved first door armor piece 292 and a curved second door armor piece 294. FIGS. 15B and 15C show that first and second door armor elements 292 and 294 are sized and shaped to closely fit against the curved inner surface of the outer skin of vehicle door 305. A Crash bar 296, either comprised of a inward bend in door armor elements 292 and 294 or comprising a separate bar attached to the door armor elements or a thicker position of the door armor elements strengthens door 305 against horizontal impact. This permits removal of the vehicle's OEM crash bar. Removal of the vehicle's OEM crash bar and use of multiple armored elements rather than a unitary armored element permits the use of armored elements which can be inserted within door 305 and fixed against its outer skin. Prefabricating armored elements 292 and 294 to be curved to fit against the inner surface of the outer skin of door 305 permits the armor to be entirely within door 305 without occupying space needed for lowering a window into door 305.

Second door armor element lip 298 fits over the edge of and is sealed to first door armor element 292. Door armor elements 292 and 294 are fitted against and scaled to the inner surface of the outer skin of door 305 and to each other to comprise a single ballistic unit against high velocity projectiles. Armor elements 292 and 294 are prefabricated rigid units comprised of either hardened steel plate, rigid molded woven ballistic material, possibly with tile layers or other suitable material. The sheet metal in armor elements 292 and 294 is preferably ⅛" thick for NATO level III armor and ¼" for NATO level IV armor. Secondary armor plate 307 is positioned behind a hole cut in armor element 292 to accommodate door 305's opening and locking mechanisms.

The invented door armor permits armoring of door 305 without blocking the interior of door 305. This leaves room for lowering a window into armored door 305. Armored windows are thicker and heavier than OEM windows. Improved regulator 304 includes heavy duty electric motor 306, heavy duty worm gear 308, heavy duty scissor mechanism 310 attached to worm gear 308 and heavy duty metal frame 312 sufficiently strong to hold worm screw 308 and support the weight of armored window 318. Scissor rollers 313 slide within window regulator bar groove 314. Window regulator 316 holds armored window 318. Support bolts 300 and 302 hold regulator 304 to armor elements 292 and 294.

This improved method and apparatus provides both an improved armored vehicle door and an armored window which goes up and down from within the body of the door or other structure. Electronic mechanism 304 may be replaced with a hand powered or other powered window regulator.

Break-In-Resistant Glass

Figure 16A:
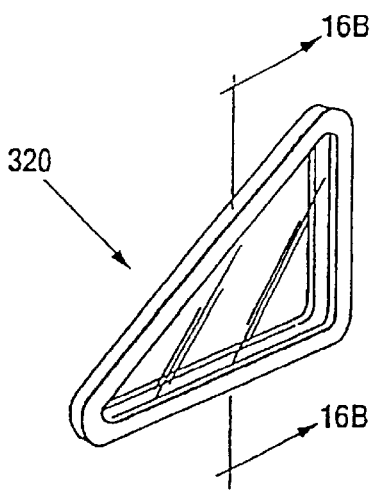
FIGS. 16A and 16B, and 16C show a break-in resistant window in perspective and through a cross section.
Figure 16B:
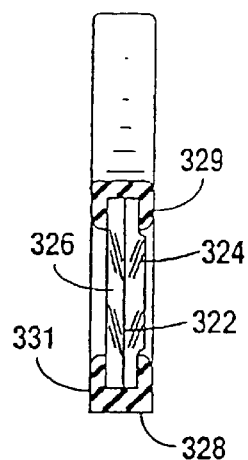

FIGS. 16A and 16B show break-in resistant side light window 320. Window 320 is prepared by adding a 0.050 to 0.080 interlayer 322 comprised of a suitable interlayer material such as polyurethane and a one-sixteenth-inch to one-eighth-inch resilient layer 324 comprised of a resilient translucent material such as polycarbonate to an outer glass layer 326 comprised of an OEM window, typically safety glass, or a glass layer sized and shaped like an OEM window, typically of one-sixteenth-inch to one-eighth-inch thickness. Edges 329 of resilient layer 324 are beveled with a router sufficiently to reduce edges 329 to a thickness which permits layer 324 to be attached to glass layer 326 and interlayer 322 to form a break-in resistant window 320 having an overall edge thickness which is sufficiently thin to be insertable into window frame 328, without damaging window frame 328. The rough beveled curve of edge 329 is buffed and polished to increase its translucence, ease movement within a channel if the window is to be movable and leave a thin translucent edge lip 331 at resilient layer's edges 324. The inside channel of the OEM seal or OEM weather stripping 328 originally holding OEM glass layer 326 can be enlarged with a router if needed so break-in resistant window 320 can fit within it.

Figure 16C:
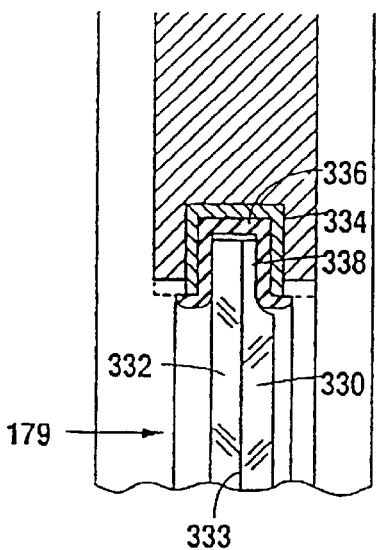

FIG. 16C shows a break-in resistant window 179 prepared as shown in FIG. 10A. The outer edge Of resilient layer 330 is beveled to reduce its thickness to a width small enough to permit it to be attached to glass layer 332 and interlayer 333 and the resultant window 179 inserted within window frame channel 334. The dimensions shown in FIG. 16C assume that weather stripping 336 remains within channel 334. Weather stripping inner lip 336 can, however, be removed to widen the space within window frame channel 334 to permit a thicker resilient layer 330 edge lip 338. The entire weather stripping of any portion of window frame channel 334 can also be removed to permit a thicker break-in resistant window 179, resilient layer 330 or edge lip 338.

Edge lips 331 and 338 are shaped, sized and comprised to have sufficient strength to resist break in resistant window 320 breaking at its edges where edge lips 331 and 338 hold break-in resistant window within weather stripping 328 or channel 334.

Sneaker Cluster

Figure 17:
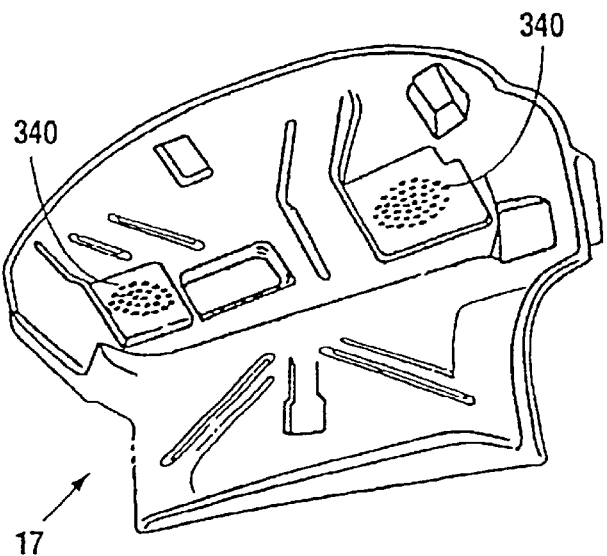
FIG. 17 shows an approved apparatus for installing speakers in an armored vehicle.

Prior art methods of armoring passenger vehicles have large holes in the armor to accommodate sound speakers. The speakers were then covered with speaker-protective covers 207 such as shown in FIG. 12. FIG. 17 shows speaker cluster 340 comprised of a cluster of small holes of sufficient size, number, and spacing to permit sound from speakers attached outside of rear armor 17 to pass through speaker cluster 340 into the passenger compartment. Speaker cluster 340, in cooperation with the ballistic effect of the speakers, vehicle structural components, and geometry, etc., permits armoring a vehicle without speaker protective covers 207.

Floor Armor

Figure 18:
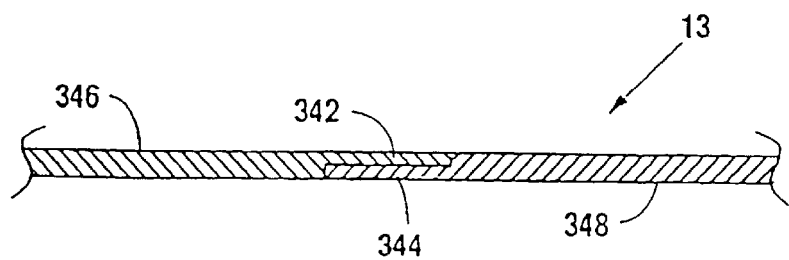
FIG. 18 shows a cross-section of a floor armor joint.

FIG. 18 shows improved floor armor 13. Overlapping armor edges 342 and 344 are each thinner than armor elements 346 and 348 overlap and are sealed together to produce a unitary floor armor unit without any thickness increase or visible bump. This concept is usable throughout the armor shown to facilitate armor fabrication and installation.

Edge Cap

Figure 19A:
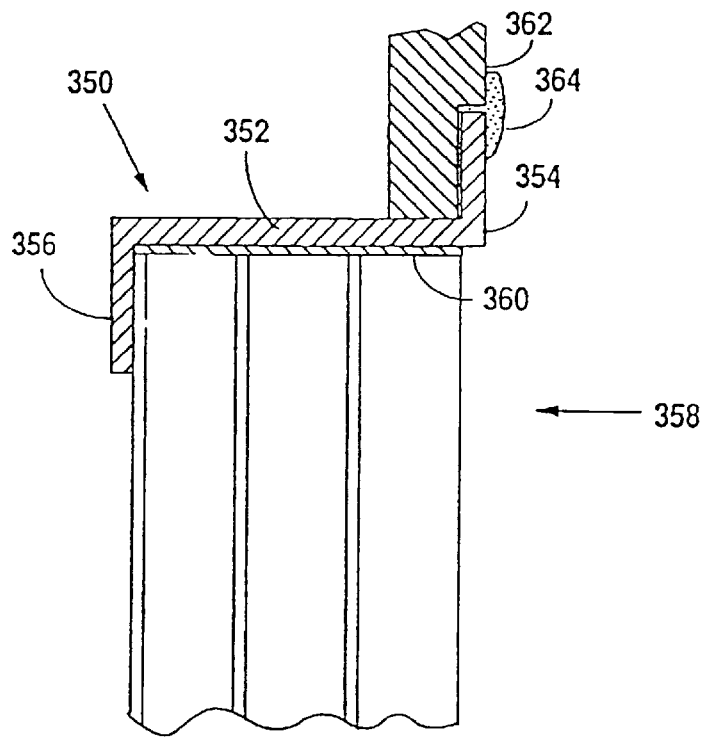
FIGS. 19A and 19B show cross sectional views of edge caps and laminated windows.
Figure 19B:
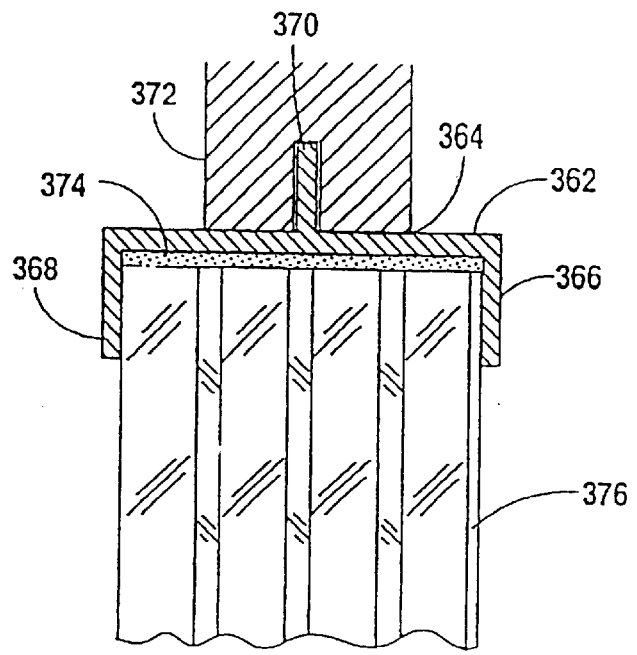

FIGS. 19A and 19B show modified edge caps. First modified edge cap 350 is comprised of base 352, protruding lip 354, and inner lip 356. First modified edge cap 350 holds armored window 358 comprised of multiple layers and interlayers. Armored window 358 is held to first modified edge cap 350 by holding layer 360 comprised of a sealant such as urethane. First modified edge cap 350 is held to OEM window frame 362 by weather strip, molding or sealant 364. Protruding lip 354 is sized to approximate the size of the OEM window or OEM window holder which window frame 362 was constructed to hold. An additional layer of sealant may be located between inner lip 356 and armored window 358 to further secure armored window to first modified edge cap 350. First modified edge cap 350 is less conspicuous than edge cap 133 shown in FIG. 6 and elimination of outer lip 139 lessens fabrication cost.

FIG. 19B shows a second modified edge cap 362 having base 364, outer lip 366, inner lip 368, protruding lip 370, OEM window frame 372, sealant layer 374, and armored window 376.

Modern aerodynamic vehicles have windows with curves and compound curves. Uneven or excessive pressures on the edges of such a window combined with its own internal stresses may cause stress cracking or other failure. The structure and tolerances of an edge cap about such a window are critical. Manufacturing a suitable edge cap is difficult.

The invented method of producing edge caps for such windows is to first manufacture a unitary edge cap, then sever the edge cap at one or more places, then fit the severed edge cap about the window and then rejoin the severed portions of the edge cap about the window. This minimizes stress between the edge cap and the window. The edge cap may be severed and rejoined by cutting it and then welding or gluing it together, by unsecuring or unbolting a severable or bolted portion and then screwing or bolting it back together or otherwise.

Figure 20A:
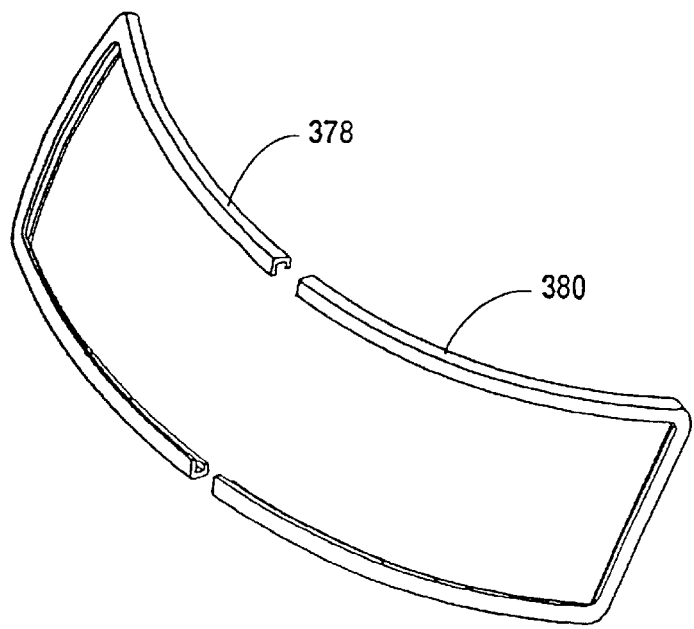
FIGS. 20A and 20B show an edge cap prior to and after installation about a curved compound window.
Figure 20B:
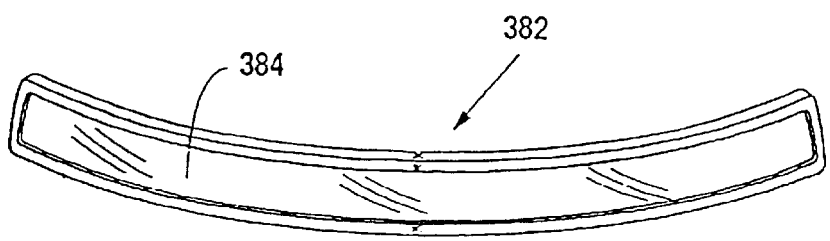

FIG. 20A shows first half edge cap 370 and second half edge cap 380. FIG. 20B shows these portions combined to comprise edge cap 382 fitted about a window 384 with compound curves.

The edge cap concept of holding thicker armored windows in a frame constructed to hold ordinary windows encompasses many different geometries and arrangements, as illustratively shown in FIGS. 6, 8, 19A. 19B, and FIG. 20B. Edge caps may be comprised of aluminum, steel, epoxy hardened composites, and other suitable materials. The edge cap concept makes possible replacement of damaged armored windows without damaging the vehicle.

Conclusion

Each of the several inventions disclosed herein are usable, either separately or in combination, for purposes other than retrofitting vehicles. The edge caps, armored windows, break-in resistant glass, and methods of making the same are useful in numerous structures, including, without limitation, airplanes, buildings, prisons, store windows, residential windows, etc. Each of the inventions is useful in other structures whether or not the structures were originally designed and constructed to be armored and is useful for increasing the structural integrity of vehicles and other structures.

While a preferred embodiment has been shown and described, it will be understood that it is not intended to limit the disclosure, but rather it is intended to cover all modifications and alternate methods falling within the spirit and the scope of the invention as defined in the appended claims or their equivalents.

Said vehicle has a speaker cluster in said armor comprised of a cluster of small holes of sufficient size, number, and spacing to permit sound from a speaker attached outside of said armor to pass through said speaker cluster into the vehicle's passenger compartment and speaker cover 207 (see FIG. 12) and 340 (see FIG. 17), armor covering the outside of said speaker.

The opaque armor is prefabricated with holes cut within the armor for fitting the armor against the multiple curved inner surfaces of the vehicles and attaching the armor to the vehicle, and the opaque armor is sized by cutting it with water jets controlled by pre-measured jigs.

The rigid opaque armor is produced by making plugs against at least one inner surface of a vehicle other than the vehicle being armored using the plugs to prepare opaque armor molds and using the opaque armor molds to mold layers of woven ballistic cloth and resin molded by setting the resin with heat and squeezing the woven ballistic cloth and resin at more than 115 pounds per square inch of air pressure in a compression chamber to produce armor which is thinner than similar armor produced at ambient temperature and pressure. The rigid armor being molded will fit closely adjacent multiple curved inner surfaces of the vehicle and the opaque armor is installed in the vehicle to fit closely adjacent multiple curved inner surfaces of the vehicle, the opaque armor being substantially hidden from view by the vehicles outer skin and inner furnishings.

The armored window 131 held by edge cap 131 is thicker than the original equipment manufactured (OEM) window frame in channel 135 and does not substantially extend to within the OEM window frame or Channel 135 as shown in FIGS. 6 and 8.

What is claimed is:

1. A commercial vehicle with inner furnishings, having a passenger compartment, a door, a body, a window frame and a curved inner surface of said vehicle body, said vehicle being retrofitted with ballistic improvements to resist penetration into said passenger compartment by projectiles, said improvements comprising:

at least one armored window, said armored window being thicker than said window frame and held within an edge cap, said edge cap engaging said window frame to hold said armored window within said window frame, an outer surface said armored window not being outside of the plane of an outer surface of an original equipment manufacture window for said window frame;

Prefabricated, curved, rigid, opaque armor sized and shaped to fit closely adjacent said one curved inner surface of said vehicle body, at least some of said opaque armor being sized and shaped to fit outside of said vehicle's inner furnishings and being positioned between said curved inner surface and said inner furnishings, said opaque armor being substantially hidden from view;

said armored window and said rigid opaque armor creating a ballistic barrier to penetration of said passenger compartment by projectiles which ballistic barrier is not readily recognizable as a ballistic barrier from outside said vehicle.

2. The commercial vehicle of claim 1, said window frame having a channel, further comprising:

said armored window being thicker than the width of said channel and;

said edge cap having a base holding said armored window and having a protruding lip attached to said base capable of cooperating with said window frame for attaching said armored window to said window frame without modifying said window frame; and a urethane protective layer between said edge cap and an edge of said armored window, said protective layer sealing said edges of said armored window from air and moisture.

3. The commercial vehicle of claim 1, further comprising:

said prefabricated, curved, rigid, opaque armor being comprised of molded layers of woven ballistic cloth hardened with resin, molded upon a mold other than said vehicle said mold being derived from a plug comprised of a vehicle other than said vehicle, said opaque armor sized and shaped to be capable of fitting closely adjacent said curved inner surface of said vehicle, said opaque armor fitting against multiple curved, inner surfaces of said vehicle and said opaque armor, in combination with an outer skin, structural elements and said inner furnishings of said vehicle, providing a ballistic barrier which is not readily recognizable as an added ballistic barrier from outside of said vehicle.

4. The commercial vehicle of claim 3 wherein said armored window is capable of being used in hot climates without cracking due to thermal expansion stress, said armored window being laminated and comprising an outer glass layer; an inner polycarbonate layer; and an interlayer of polyurethane between said glass layer and said polycarbonate layer, said interlayer being between 0.075 and 0.100 inches thick and being capable of accommodating the different thermal expansion properties of said glass layer and said polycarbonate layer in hot climate without said window cracking.

5. The commercial vehicle of claim 3, wherein said vehicle has passenger compartment fire wall armor having a ventilation cluster comprised of a cluster of small holes of sufficient size, number and spacing to usefully ventilate said vehicle's passenger compartment and having hoses attached to either side of said ventilation holes.

6. The commercial vehicle of claim 3, wherein, said vehicle has a speaker cluster in said armor comprised of a cluster of small holes of sufficient size, number, and spacing to permit sound from a speaker attached outside of said armor to pass through said speaker cluster into said vehicle's passenger compartment and speaker cover armor covering the outside of said speaker.

7. The commercial vehicle of claim 1, wherein said window frame of claim 1 is located in said door and includes a channel said improvements comprising:

said armored window of claim 1 is thicker than the channel of the window frame of said door, said edge cap holds said armored window, said edge cap has a protruding lip which protrudes within the channel of the window frame, is slidable within the window frame, and retains said armored window within said window frame; and said armored window is capable of being lowered into and raised out of the body of said door; and said door having armor thereon with said at least one armored window being a moveable armored window within said window frame.

8. A method of armoring a vehicle with inner furnishings to be a lightweight armored vehicle comprised of the following steps:

installing prefabricated curved rigid opaque armor within said vehicle adjacent to at least one curved opaque surface of said vehicle; said opaque armor being shaped to accommodate contours of inner opaque surfaces of said vehicle to permit said opaque armor to fit closely adjacent to at least one of said curved opaque surfaces of said vehicle and outside of at least one of said vehicle's inner furnishings and being positioned between said curved inner surface and said inner furnishings, said opaque armor being substantially hidden from view; and installing armored windows to create a barrier to penetration by projectiles; said armored windows comprising laminated transparent armor thicker than window frames of said vehicle, the outer surface of the armored windshield not being outside the plane of the outer surface of an original equipment manufacturer windshield.

9. The method of claim 8, wherein said curved rigid opaque armor is produced by making plugs against at least one inner surface of a vehicle other than said vehicle being armored, using said plugs to prepare opaque armor molds; and using said opaque armor molds to mold layers of woven ballistic cloth and resin molded by setting said resin with heat and squeezing the woven ballistic cloth and resin at more than 115 pounds per square inch of air pressure in a compression chamber to produce armor which is thinner than armor produced at ambient temperature and pressure, said rigid armor being molded to fit closely adjacent multiple curved inner surfaces of said vehicle, and said opaque armor is installed in said vehicle to fit closely adjacent said multiple curved inner surfaces of said vehicle, said opaque armor being substantially hidden from view by an outer skin of said vehicle and said inner furnishings.

10. The method of claim 9, wherein said curved, rigid, opaque armor comprises retrofitting an unarmored vehicle to be a lightweight armored vehicle including removing said interior furnishings from a passenger compartment of said vehicle, installing said curved, rigid, opaque armor and refurbishing said interior furnishings to said passenger compartment with said curved, rigid, opaque armor being substantially hidden from view.

11. The method of claim 10 wherein said armored windows are produced from molds derived from original equipment manufacture window plugs.

12. The method of claim 9, wherein some of the curved, rigid, opaque armor is substantially comprised of no more than two prefabricated, curved, rigid armor elements shaped to conform to a multiple, curved inner surface of a floor of said vehicle and other of the curved, rigid, opaque armor is substantially comprised only of a single armored element shaped to conform to a curved inner surface of a roof of said vehicle.

13. The method of claim 12, wherein said curved, rigid, opaque armor is comprised of a layer of ceramic armor and layers of said ballistic cloth.

14. The method of claim 13, wherein said curved, rigid, opaque armor includes ceramic material comprised of at least four layers of tiles covered on an outer face of said armor by more than one rigid ballistic cloth layer and a second layer of tiles separated from said first layer of tiles of at least four layers of rigid ballistic cloth.

15. The method of claim 14, wherein said opaque armor is sized by cutting it with water jets controlled by premeasured jigs.

16. A commercial vehicle having a passenger compartment, a window frame and a curved inner surface, said vehicle being retrofitted with ballistic improvements to resist penetration into said passenger compartment by projectiles, said improvements comprising:

at least one armored window, said armored window being thicker than said window frame and held within an edge cap, said edge cap engaging said window frame to hold said armored window within said window frame;

prefabricated, curved, rigid, opaque armor sized and shaped to fit closely adjacent to at least one curved inner surface of said vehicle, at least some of said opaque armor being sized and shaped to fit outside of said vehicle's inner furnishings and being positioned between said curved inner surface and said inner furnishings, said opaque armor being substantially hidden from view;

said armored window and said rigid opaque armor creating a ballistic barrier to penetration of said passenger compartment by projectiles which ballistic barrier is not readily recognizable as a ballistic barrier from outside said vehicle; and at least one said window frame having a channel, said edge cap having a protruding lip, said protruding lip fitting within said channel to hold said armored window within said window frame.

17. The commercial vehicle of claim 16, said edge cap being shaped and sized to fit within said window frame with approximately the same fit and dimensions as a window being replaced in retrofitting fit within said window frame.

18. The commercial vehicle of claim 16, said edge cap being shaped and sized to fit within said window frame channel, said window frame channel comprising an indentation in said window frame, said indentation having only one side.

\* \* \* \* \*